(12) United States Patent
Seed et al.

(10) Patent No.: US 10,708,376 B2
(45) Date of Patent: Jul. 7, 2020

(54) MESSAGE BUS SERVICE DIRECTORY

(71) Applicant: CONVIDA WIRELESS, LLC, Wilmington, DE (US)

(72) Inventors: Dale N. Seed, Allentown, PA (US); William Robert Flynn, IV, Schwenksville, PA (US); Paul L. Russell, Jr., Pennington, NJ (US); Narayan P. Menon, Syosset, NY (US); Richard P. Gorman, Ivyland, PA (US); Quang Ly, North Wales, PA (US); Hongkun Li, Malvern, PA (US); Donald A. Fleck, Emmaus, PA (US); Zhuo Chen, Claymont, DE (US); Michael F. Starsinic, Newtown, PA (US); Thomas S. Gilley, New York, NY (US); David Goehrig, Buffalo, NY (US)

(73) Assignee: Convida Wireless, LLC, Wilmington, DE (US)

( * ) Notice: Subject to any disclaimer, the term of this patent is extended or adjusted under 35 U.S.C. 154(b) by 278 days.

(21) Appl. No.: 15/048,506

(22) Filed: Feb. 19, 2016

(65) Prior Publication Data
US 2016/0248871 A1  Aug. 25, 2016

Related U.S. Application Data

(60) Provisional application No. 62/118,882, filed on Feb. 20, 2015.

(51) Int. Cl.
*H04L 29/08* (2006.01)
*H04L 29/12* (2006.01)
*H04W 4/70* (2018.01)

(52) U.S. Cl.
CPC ...... *H04L 67/2809* (2013.01); *H04L 61/1511* (2013.01); *H04L 67/16* (2013.01); *H04W 4/70* (2018.02)

(58) Field of Classification Search
CPC . H04L 67/2809; H04L 61/1511; H04L 67/16; H04W 4/005
(Continued)

(56) References Cited

U.S. PATENT DOCUMENTS

| 6,594,700 B1 | 7/2003 | Graham |
| 6,782,541 B1 * | 8/2004 | Cohen ..................... G06F 9/465 |
| | | 719/315 |

(Continued)

FOREIGN PATENT DOCUMENTS

| CN | 101669113 A | 3/2010 |
| CN | 103384201 A | 11/2013 |

(Continued)

OTHER PUBLICATIONS

International Patent Application No. PCT/US2016/018692: International Preliminary Report dated Aug. 31, 2017, 9 pages.
(Continued)

*Primary Examiner* — Abdullahi E Salad
(74) *Attorney, Agent, or Firm* — BakerHostetler

(57) ABSTRACT

Presented herein is a messaging system architecture that is referred to as an "Open Message Bus" (OMB). The OMB is a messaging system infrastructure that facilitates connectivity and communication between services. The OMB backbone may offer infrastructure services that can be leveraged by all services that connect to the OMB.

18 Claims, 20 Drawing Sheets

(58) Field of Classification Search
USPC .................................................. 709/204
See application file for complete search history.

(56) References Cited

U.S. PATENT DOCUMENTS

| | | | | |
|---|---|---|---|---|
| 8,346,929 | B1* | 1/2013 | Lai | G06Q 10/10 709/226 |
| 8,484,663 | B2 | 7/2013 | Rafnsson | |
| 2002/0174000 | A1* | 11/2002 | Katz | G06Q 10/06316 705/7.26 |
| 2002/0196741 | A1* | 12/2002 | Jaramillo | H04L 51/18 370/252 |
| 2006/0029054 | A1* | 2/2006 | Breh | G06F 8/61 370/385 |
| 2008/0104258 | A1* | 5/2008 | O'Neill | H04L 67/325 709/228 |
| 2008/0271047 | A1 | 10/2008 | Rafnsson | |
| 2008/0279161 | A1* | 11/2008 | Stirbu | H04W 8/18 370/338 |
| 2011/0314163 | A1* | 12/2011 | Borins | H04W 4/08 709/227 |
| 2012/0134287 | A1* | 5/2012 | Turunen | H04W 4/06 370/252 |
| 2013/0166703 | A1* | 6/2013 | Hammer | H04L 41/50 709/220 |
| 2013/0232271 | A1 | 9/2013 | Kim | |
| 2013/0282860 | A1* | 10/2013 | Zhang | H04L 45/306 709/217 |
| 2014/0089478 | A1 | 3/2014 | Seed et al. | |
| 2014/0310358 | A1* | 10/2014 | Pignataro | H04L 51/046 709/206 |
| 2014/0325009 | A1* | 10/2014 | Hood | H04L 67/34 709/206 |
| 2015/0156266 | A1* | 6/2015 | Gupta | H04W 4/70 709/224 |
| 2015/0256404 | A1* | 9/2015 | Evans | H04L 67/16 709/224 |
| 2015/0289123 | A1* | 10/2015 | Shatzkamer | G06Q 10/06 455/406 |
| 2015/0301875 | A1* | 10/2015 | Harnesk | G06F 9/546 719/313 |
| 2015/0312179 | A1* | 10/2015 | Ben-Ezra | H04L 51/043 709/203 |
| 2016/0007138 | A1* | 1/2016 | Palanisamy | H04W 4/70 455/41.2 |
| 2016/0019294 | A1* | 1/2016 | Dong | H04W 4/70 707/794 |
| 2016/0028596 | A1* | 1/2016 | Lund | H04L 41/5058 709/224 |
| 2016/0128043 | A1* | 5/2016 | Shuman | H04W 72/044 370/331 |
| 2016/0156513 | A1* | 6/2016 | Zhang | H04W 4/70 709/220 |
| 2016/0205097 | A1* | 7/2016 | Yacoub | H04L 63/0876 726/6 |
| 2016/0205106 | A1* | 7/2016 | Yacoub | H04L 61/1511 726/28 |
| 2016/0212225 | A1* | 7/2016 | Smith | G06F 9/5027 |
| 2016/0219116 | A1* | 7/2016 | Smith | H04L 67/16 |
| 2016/0226937 | A1* | 8/2016 | Patel | H04L 65/4061 |
| 2017/0006135 | A1* | 1/2017 | Siebel | H04L 67/02 |
| 2017/0063566 | A1* | 3/2017 | Seminario | H04L 12/2816 |
| 2017/0208139 | A1* | 7/2017 | Li | H04W 4/70 |
| 2017/0279775 | A1* | 9/2017 | Savolainen | H04L 63/0281 |
| 2017/0337088 | A1* | 11/2017 | Wang | G06F 9/541 |
| 2017/0374042 | A1* | 12/2017 | James | H04L 63/0442 |

FOREIGN PATENT DOCUMENTS

| | | |
|---|---|---|
| CN | 103503487 A | 1/2014 |
| EP | 2 661 012 A1 | 11/2013 |
| JP | 2004-334896 A | 11/2004 |
| KR | 10-2008-0064587 A | 7/2008 |
| KR | 10-2013-0122923 A | 11/2013 |
| WO | WO 2008-082021 A1 | 7/2008 |
| WO | WO 2012/118711 A2 | 9/2012 |

OTHER PUBLICATIONS

Cheshire, S. and Krochmal, M, "DNS-Based Service Discovery", Internet Engineering Task Force (IETF), RFC #6763, Feb. 2013, 49 pages.

Gulbrandsen et al, "A DNS RR for Specifying the Location of Services (DNS SRV)", Network Working Group, RFC # 2782, Feb. 2000, 12 pages.

Mockapetris, P, "Domain Names—Implementation and Specification" Network Working Group, RFC # 1035, Nov. 1987, 55 pages.

Onem2m Technical Specification, oneM2M-TS-0001—V-1.1.0, "oneM2M Functional Architecture Baseline Draft", Aug. 9, 2014, 367 pages.

Onem2m Technical Specification, TS-0007-Service_Component_Architecture-V0_2_0, "Service Component Architecture", May 15, 20014, 47 pages.

OASIS#MQTT Version 3.1.1 Committee Specification 01 approved and published, May 18, 2014, 3 pages, https://www.oasis-open.org.

OASIS Advanced Message Queuing Protocol (AMQP) Version 1.0, OASIS Standard, Oct. 29, 2012, 125 pages, https://docs.oasis-open.org/amqp/core/v1.0/os/amqp-core-overview-v1.0-os.xml.

International Application No. PCT/US2016/018692: International Search Report and the Written Opinion dated May 24, 2016, 14 pages.

Paganelli et al, "Message-Based Service Brokering and Dynamic Composition in the SAI Middleware", 2010 IEEE International Conference on Services Computing, IEEE, Piscataway, NJ, USA, Jul. 5, 2010, 474-481.

Srirama et al, "Mobile Enterprise—A Case Study of Enterprise Service Integration", Next Generation Mobile Applications, Services and Technologies, 2009. NGMAST '09. Third International Conference on, IEEE, Piscataway, NJ, USA, Sep. 15, 2009, 101-107.

* cited by examiner

MESSAGE BUS SERVICE DIRECTORY

CROSS REFERENCE TO RELATED APPLICATIONS

This application claims the benefit of U.S. Provisional Patent Application No. 62/118,882, filed on Feb. 20, 2015, entitled "Message Bus Service Directory," the contents of which are hereby incorporated by reference herein.

BACKGROUND

Existing Messaging Based Middleware Architectures

Message based middleware provides a "message layer" between communicating services, thus abstracting the underlying operational environment that each service runs on. In other words, the "message layer" acts as a middleman in exchanging messages between services. FIG. 1 shows a high level representation of message based middleware. In FIG. 1, four services communicate via a common middleware platform. Each service may run on different platforms (e.g., hardware platforms, operating systems, etc.). The middleware abstracts the underlying operational environment of each service so that they can communicate via some defined messaging protocol.

There are many message based middleware architectures. Middleware architectures can include features such as message queues, publish/subscribe, and message brokers. A middleware layer can be based on the concept of a message queue. Queue based middleware architecture can take many different forms; there may be a single shared queue that is used to send messages to all services, a dedicated queue for each service to receive messages from, or a dedicated queue for each service to send messages to, among other techniques. In a publish/subscribe model, messages are sent (published) to a destination in the middleware. The destination depends on the message "topic" (sometimes called channel). Services that want to receive messages related to a particular topic "subscribe" to the topic. Topics may be related to the message type (debug, alarm, warning, or task request). The message broker may be implemented with a number of queues, as a publish/subscribe architecture with a number of topics, etc. The term message broker is a part of a message bus that commonly refers to the entity that receives all messages and distributes all messages.

Message Types

Messages sent and from or to a middleware broker may be characterized in several different ways. Four common types of messages are send messages, receiving messages (blocking), receiving messages (non-blocking), and notifications. Send Messages are sent to a broker by a service. Once the service sends the message to the broker, the service expects no response and execution of the service continues. Blocking messages are messages that will cause the service to pause (block) until the service receives the message. For example, if a service attempts to read a message from a broker, or queue, and the message is not ready, then the service's execution will block. Non-blocking messages are messages that will not cause the service to pause (block) until the message is ready. For example, if a service attempts to read a message from a broker, or queue, and the message is not ready, then the service's execution will continue until the message is ready. When a service attempts a non-blocking read, it may provide the broker with a callback function that may be called when the message is ready. Notification messages are messages that the broker sends to a service as a result of some previous request. For example, the previous request may have been a non-blocking read attempt or a subscribe request.

Message Bus Protocols

Advanced Message Queuing Protocol (AMQP) is a message bus protocol. FIG. 2 shows the relationship between AMQP Exchanges and Queues. An AMQP Exchange accepts messages from a service and routes the message to one or more Queue. The Exchange can be designed to route the message based on a static rule (e.g., send the message to these 5 services), based one whatever queues bind themselves to the exchange, based on the message topic, or based on values in the message header.

The Message Queuing Telemetry Transport (MQTT), e.g., reference OASIS MQTT V3.1.1 Committee Specification 01, 18 May 2014, is a message based middleware protocol. MQTT is a low overhead message queuing and transport protocol tailored for constrained devices and low bandwidth networks that is most famously deployed in the Facebook Messenger mobile app. It uses a publish/subscribe (or client/server) model. Elements of MQTT are clients (which can be both publisher and subscriber), servers (also referred to as brokers), sessions, subscriptions and topics. Like HTTP, the MQTT protocol is asymmetric in that it distinguishes between two different roles: client and server.

In MQTT terms, a client is a program or device that uses MQTT. It always establishes the network connection to the server. A client can Publish application messages that other clients might be interested in.

Subscribe to request application messages that it is interested in receiving.

Unsubscribe to remove a request for application messages.

Disconnect from the server.

An MQTT server is an entity that accepts connections from clients. Unlike HTTP it generally does not run any application logic, instead an MQTT Server acts as an intermediary between clients publishing application messages and the clients which have subscribed to receive them.

Topics are the "Q" in MQTT—they are named message queues maintained by the server in order to link publishers with subscribers. An MQTT client assumes the role of publisher when it issues a PUBLISH message to an MQTT server (e.g., an instruction to deliver the opaque message payload to any client subscribed to the supplied topic name), and assumes the role of subscriber when it issues a SUBSCRIBE message to the MQTT server (e.g., an instruction to receive any PUBLISH messages that match the supplied topic filter). A topic filter is an expression contained in a subscription, to indicate an interest in one or more topics. A topic filter may include wildcard characters. PUBLISH messages are delivered with one of three QoS levels of assurance, such as at-most-once, at-least-once, exactly-once.

Sessions and subscriptions represent two levels of attachment between a client and a server. A session is a stateful interaction (e.g., an active TCP/IP network connection) between a client and a server, and is identified by a unique client identifier. A session can be established only by a client sending a CONNECT message to a server. Flags in the CONNECT, PUBLISH, and SUBSCRIBE messages determine how session state is maintained if a session is disconnected.

Domain Name System (DNS)

The Domain Name System (DNS) is defined in RFC 1035. DNS is not a type of message bus or middleware, rather it is a hierarchical naming system built on a distributed database for computers, services, or any resource connected to the Internet or a private network. It is designed to associate IP addresses with domain names assigned to each of the participating entities.

Domain Name System-Service Discovery (DNS-SD)

DNS based Service Discovery (DNS-SD) is not a type of message bus or middleware, rather it is a protocol that uses standard DNS programming interfaces, servers, and packet formats to support discovery of network services. Given a type of service that a client is looking for and a domain in which the client is looking for that service, this mechanism allows clients to discover a list of named instances of that desired service using standard DNS queries.

A particular service instance can be described using a DNS service location record (SRV) as discussed in RFC 2782 and DNS text record (TXT) as discussed in RFC 6763. The SRV record has a name of the form "<Instance>.<Service>.<Domain>" and gives the target host and port where the service instance can be reached. The DNS TXT record of the same name gives additional information about this instance in a structured form using key/value pairs (e.g., scl=<uri_path_to_sclBase>). A client discovers the list of available instances of a given service type using a DNS query for a DNS pointer record (PTR), as discussed in RFC 6763, with a name of the form "<Service>.<Domain>", which returns a set of zero or more names, which are the names of the aforementioned DNS SRV/TXT record pairs. A client can then perform a second DNS query to retrieve the SRV/TXT record pair(s) and get the discovery information contained within these records. Using this discovered host, port, and additional discovery information; a client can then access/invoke a service of interest.

oneM2M Service Layer

Service Layers are a set of protocols that define how services interact with applications and other services. The oneM2M Service Layer is organized as a set of common functions (or service capabilities), an instantiation of which is referred to as a common services entity (CSE), as discussed in oneM2M TS-0001 Functional Architecture. These common functions are exposed via the Mca, Mcc, and Mcn reference points as shown in FIG. 3 and FIG. 4. FIG. 4 also highlights the Msc reference point. The Msc reference point specifies set of interactions between the service Capabilities of different Service Components. The realization of the interaction between the Services Capabilities is implementation specific as discussed in oneM2M TS-0007 Service Component Architecture.

The Mca reference point designates communication flows between an application entity (AE) and a CSE, while the Mcc reference point designates communication flows between two CSEs in the same M2M service provider domain. Communications across Mca and Mcc take place via paired request/response messages, wherein each request performs a specific RESTful operation (e.g., Create, Retrieve, Update, Delete) upon a resource hosted on the targeted CSE. Mcc' is used between CSEs located in the infrastructure domain of different M2M SPs. Mcn is used between a CSE and an underlying network services entity (NSE) for services other than transport and connectivity.

CSEs are hosted on architectural entities referred to as "nodes". A node is a functional entity that contains a) one CSE and zero or more AEs, or b) one or more AEs. Services that are provided by CSE's may vary from a temperature sensor service that is implemented on a low cost device to a billing system that is deployed on a large network server. Thus, the architecture is well suited for utilizing a messaging protocol.

SUMMARY

Presented herein is a messaging system architecture that we refer to as the "Open Message Bus" (OMB). The OMB is a messaging system infrastructure that facilitates connectivity and communication between services. The OMB backbone offers some infrastructure services that can be leveraged by all services that connect to the OMB.

The OMB infrastructure offers a service directory and discovery service. The discovery service allows clients to browse a service directory, or database, that catalogs what services are available via the OMB and provides additional details such as which protocols the services require to communicate, the cost associated with accessing the services, etc. The OMB provides a DNS-SD interface that services can use to dynamically discover what services are available on the OMB that are of interest to them and then use the information that was obtained during discovery to connect to the OMB and communicate with these discovered services.

Once a service joins the OMB it can subscribe to the service directory and receive notifications when particular services or particular classes of services connect or disconnect from the OMB.

The OMB may utilize a transport agnostic API. The API is designed such that services can use any underlying transport and application level protocols (UDP, CoAP, TCP, WebSockets, HTTP, etc.) to connect to the bus and communicate with other services that use different underlying transport and application level protocols.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EXAMPLES

Discussed herein is a messaging bus (also referred to as an "Open Message Bus" (OMB)) that facilitates connectivity and communication between services. The disclosed messaging bus offers infrastructure services that may be leveraged by services that connect with the messaging bus.

Conventional messaging bus protocols, such as Advanced Message Queuing Protocol (AMQP) and Message Queuing Telemetry Transport (MQTT), do not have built-in support for dynamically discovering what services are available on a message bus. Thus, a service that is connected to a message bus might not be aware of what other services are on the message bus. This can result in the underutilization of services of the message bus. For example, a home automation service provider might be able to more efficiently manage a home heating and cooling system if it is able to connect to a service that provides information about local weather conditions. AMQP and MQTT provide no means for the home automation provider to dynamically discover and use the weather service.

The OMB infrastructure may offer a service directory that comprises a discovery service. The discovery service allows clients to browse a service directory or database that catalogs what services are available via the OMB. The discovery service may also provide additional details, such as which protocols the services require to communicate or the cost associated with accessing the services, among other things. In an example, the OMB provides a DNS-SD interface that services can use to dynamically discover what services are available on the OMB that are of interest to them and then use the information that was obtained during discovery to connect to the OMB and communicate with these discovered services.

When a service joins the OMB, it may be referred to as an OMB client. An OMB client can subscribe to the service directory and receive notifications when particular services (including particular classes of services) connect or disconnect from the OMB.

The OMB may utilize a transport agnostic application programming interface (API). The API is designed such that services can use any underlying transport and application level protocols (UDP, CoAP, TCP, WebSockets, HTTP, AMQP, MQTT, XMPP, etc.) to connect to the bus and communicate with other services that use different underlying transport and application level protocols.

Figure 5:
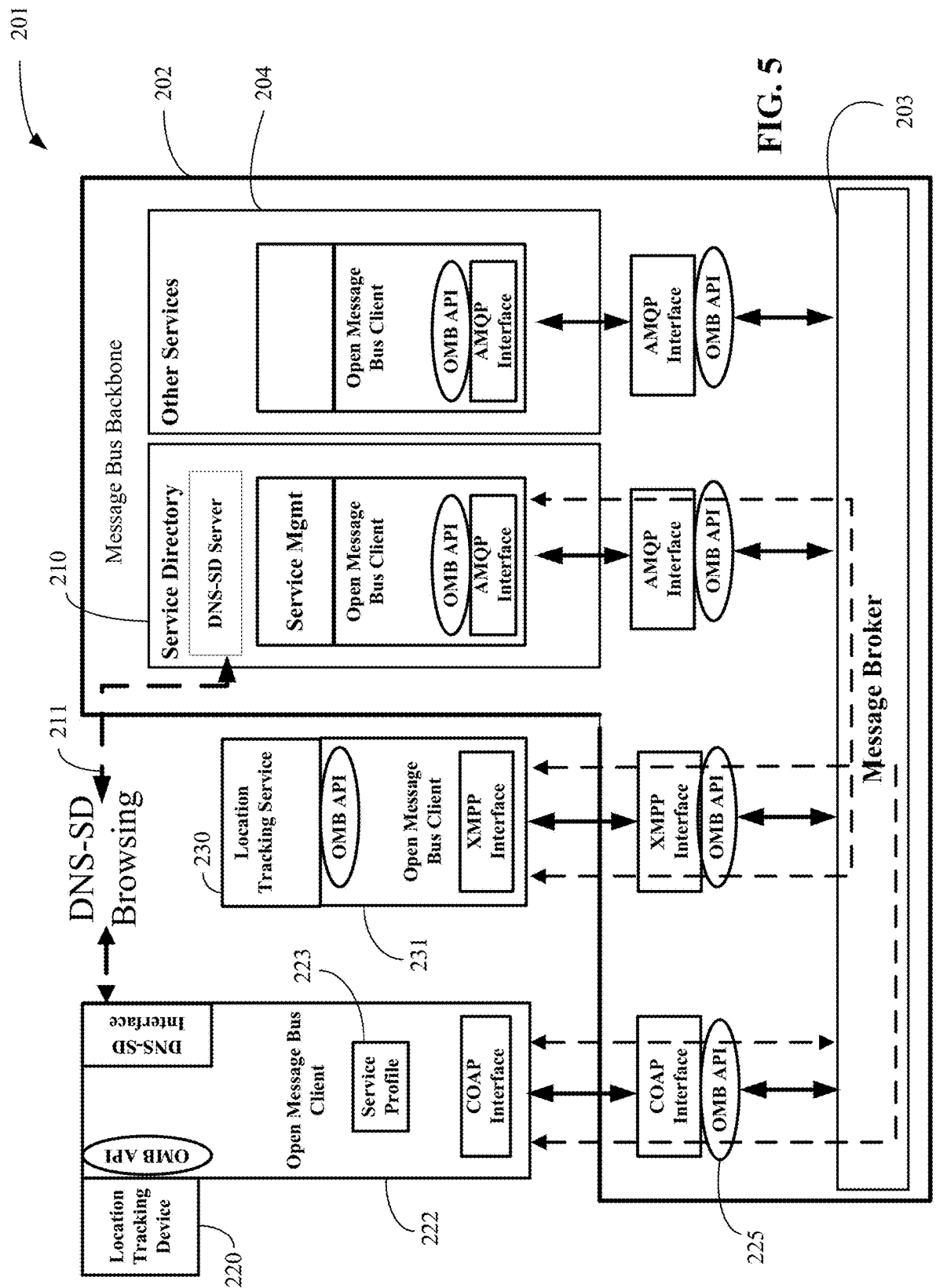
FIG. 5 illustrates an exemplary open message bus architecture.
Figure 7:
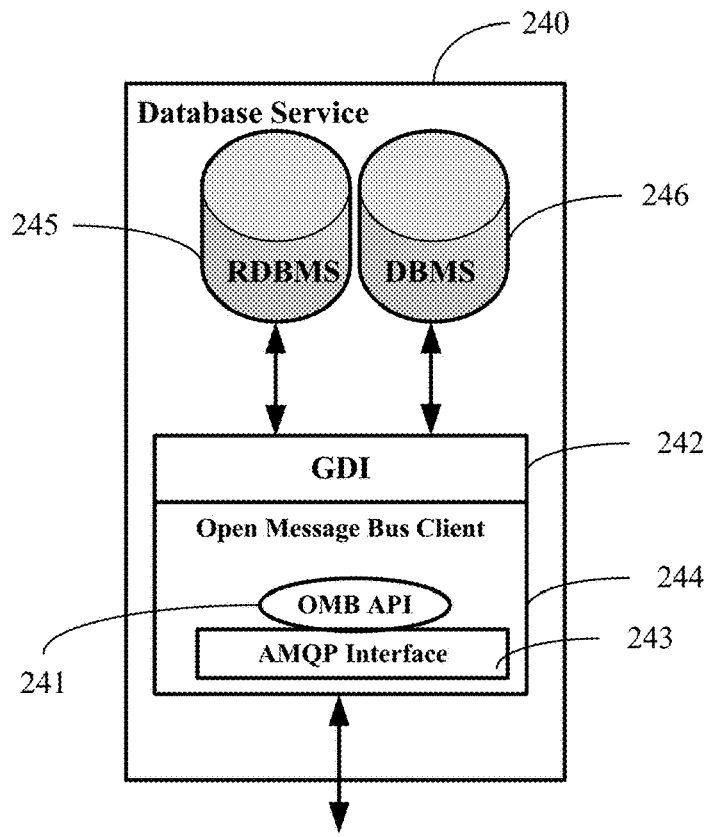
FIG. 7 illustrates an exemplary database service operating in an open message bus architecture.
Figure 8:
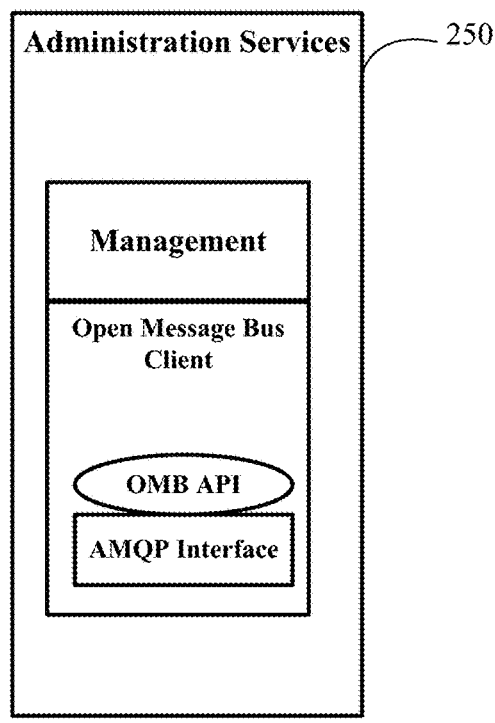
FIG. 8 illustrates an exemplary administration service operating in an open message bus architecture.

FIG. 5 is an exemplary illustration of an OMB architecture 201. OMB architecture 201 has message bus backbone 202 that includes message broker 203 as well as one or more message bus backbone 202 services (i.e., infrastructure services—discussed in more detail herein), such as service directory 210 or other services 204. Other services 204 may include database service 240 and administration services 250, among other things, as shown in FIG. 7 and FIG. 8, respectively. Database service 240, discussed in further detail herein, may be used by services to store and query information. Administration services 250 may be used for administering and monitoring client services connecting with message bus backbone 202.

Service directory 210 may be used for dynamic discovery and publishing of services connected with message broker 203. Service directory 210 supports DNS-SD interface 211 as well as an OMB API 212. DNS-SD interface 211 can be used by a first service (e.g., location tracking device 220) to browse available services connected with message broker 203 before location tracking device 220 registers or connects with message broker 203. Once location tracking device 220 is registered with message broker 203, an OMB API 225 can be used to utilize a subscription or notification mechanism associated with message bus backbone 202. A subscription is when a service says that it wants to know when event X happens. A notification is when the service is told that event X has occurred. The subscription or notification mechanism may not be available on DNS-SD interface 211. The subscription or notification mechanism allows services, such as location tracking device 220, to subscribe to service directory 210 in order to receive notifications regarding other services. For example, location tracking device 220 can subscribe to receive a notification when a service that location tracking device 220 is interested in connects or disconnects with the bus. Service directory 210 and the subscription or notification mechanism (e.g., subscription or notification 213 of FIG. 6) are described in more detail herein.

As discussed in more detail herein, services interface to message backbone 202 via OMB clients, such as OMB client 222, which provide a layer of abstraction (API) between the services and the underlying transport (e.g. AMQP, UDP, MQTT, XMPP, WebSockets, etc.) used by the OMB.

OMB architecture 201 and its transport agnostic API (e.g., OMB API 225) allow the design to scale. The design accommodates large deployments (e.g. cloud infrastructure) to smaller deployments (e.g. a home gateway). For example, cloud based deployments where services are hosted on many remote servers, down to deployments where all services are hosted on an individual device, e.g., a low complexity temperature sensor.

Figure 6:
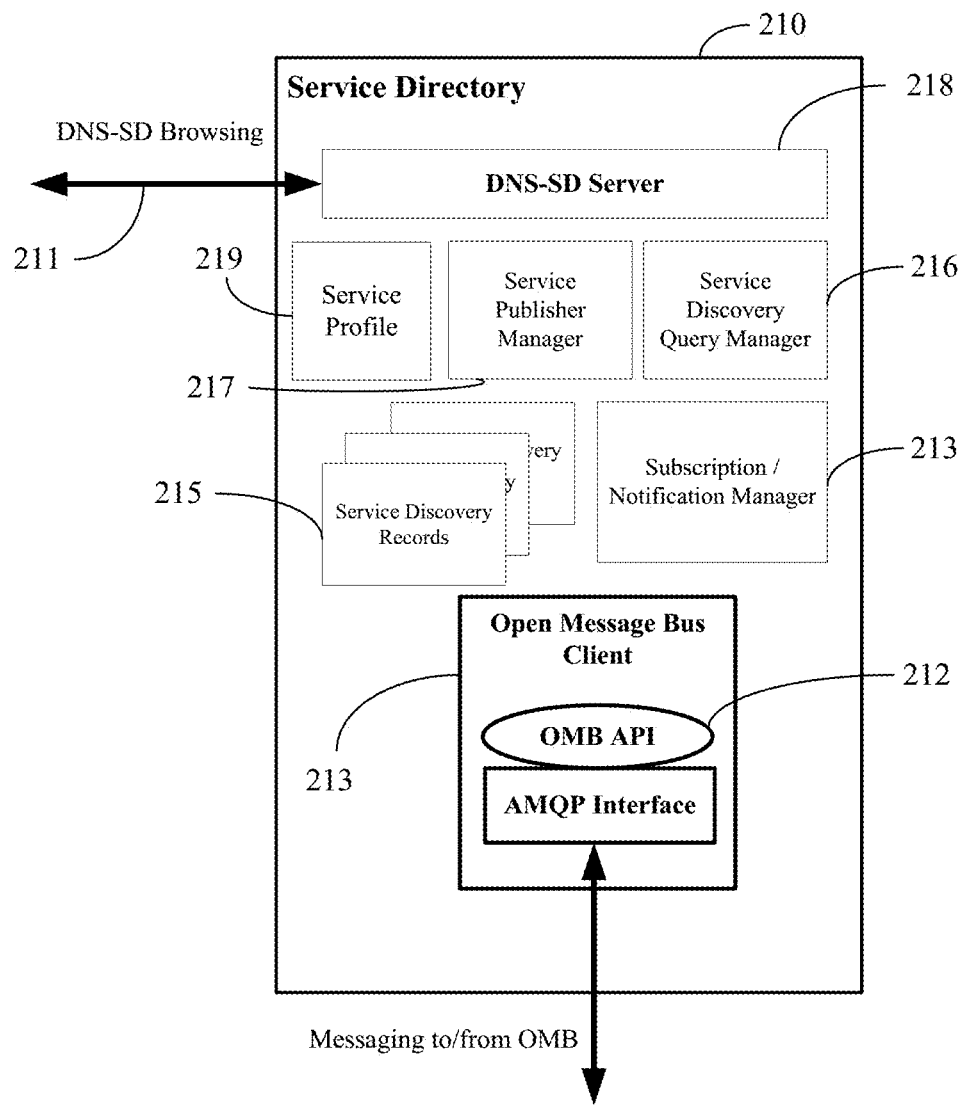
FIG. 6 illustrates an exemplary service directory operating in an open message bus architecture.

FIG. 6 illustrates an exemplary service directory 210 operating in OMB architecture 201. Service directory 210 can support OMB client 214, DNS-SD server 218 connected with DNS-SD interface 211, service publisher manager 217, service discovery query manager 216, subscription or notification manager 213, and service discovery record storage 215, among other things. Service publisher manager 217 accepts service creation requests. It may be used to enter new service profiles in the service directory 210. Service discovery query manager 216 accepts service queries from other services and checks if the request service is in service directory 210. Subscription/Notification manager 213 may accept subscription requests from other services and generate the request notifications when new services are entered into service directory 210. DNS-SD interface 211 allows services (e.g., location tracking device 220) to browse service directory 210 without accessing message broker 203 or other portions of message backbone 202. DNS-SD interface 211 may be particularly useful when location tracking device 220 (or other services) want to dynamically determine what services are offered via message backbone 202 before deciding if location tracking device 220 should connect with the message backbone 202.

A service profile (e.g., service profile 219) consists of the PTR, SRV, and TXT records that describe a service (e.g., location tracking device 220 or location tracking service 230). Service profile 219 would be an entry in a table, which would reside in memory. OMB APIs (e.g., OMB API 225 or OMB API 212) allow service profiles to be registered in service directory 210, allows discovery or search operations to be performed on service directory 210, and allows other OMB clients (e.g., OMB client 222) to issue subscribe requests to service directory 210. Subscribe requests may be used to request notifications when particular services register (or deregister) in service directory 210.

Presented later herein (e.g., Table 3) are lists of the OMB calls that are associated with service directory 210. The ombConfig( ) API allows service profile 223 to be loaded into service directory 210. For example, the ombConfig( ) API may be used when a network administrator wishes to use administration service 250 to load a service's profile (e.g., service profile 223 for location tracking device 220) in service directory 210. Alternatively, location tracking device 220 can use the ombConfig( ) API to load its own service profile 223 into service directory 210. For example, when service profile 223 for location tracking device 220 is loaded by a network administrator, location tracking device 220 may use the ombConfig( ) API to fetch its service profile 223 and learn how to properly connect with and configure message broker 203 (via its OMB client 222) as well as determine other services it has dependencies on.

OMB API 212 allows service directory 210 to receive publish, subscribe, and create discovery requests from other OMB services and to send notifications to other OMB services. The subscribe or notify feature allows other services connected with the one or more components of message bus backbone 202 (or an OMB client associated with a service) to subscribe to service directory 210 and receive notifications based on specified criteria (e.g., a particular type of service has created, updated, or deleted a service directory profile. Note a service directory profile as used herein is considered a service profile.

Service directory 210 stores service profile 219 within a database using DNS-SD record types (PTR, SRV, and TXT). The service profiles of each service connected with message broker 203 (i.e., an OMB service) are provisioned into the DNS-SD server 218 either statically, or dynamically via the Admin Console (administration service 250), or dynamically by the OMB service's use of the ombConfig( ) API. These records are configured with the service discovery and configuration information that is listed in Table 1.

TABLE 1

Example of OMB Service Configuration Information

| Parameter | Description |
|---|---|
| Customary Information for Service Configuration Files | |
| DNS Based Configuration | A flag that determines whether OMB service configuration is based solely on a single configure file or if it requires a DNS TXT Record lookup. |
| DNS-SD Server IP Address | IP Address of DNS-SD Server |
| DNS Service Port | Port of DNS-SD Server |
| FQDN | FQDN assigned to OMB Service |
| Information for Service Configuration Files when Type 1 Configuration is used | |
| OMB Service ID | OMB Service ID assigned to OMB Service |
| OMB Transport Protocol | The type of transport that is used (e.g. AMQP, MQTT, etc.) |
| OMB Service Name | The name assigned to a service (e.g. NAE1, NRAR3, . . . ) |
| Partner OMB Services | The other OMB service types that this OMB service interacts with (e.g. NRAR, NSEC, . . . ) |
| OMB Broker IP | IP address of Message broker |
| OMB Broker Port | Port of Message broker |
| OMB User Name | User name that OMB Service uses when logging in to Message broker |
| OMB Password | Password that OMB Service uses when logging in to Message broker |
| OMB Exchange Names | List of OMB exchanges that OMB Service uses. An exchange is part of the OMB. An exchange accepts messages from a service and routes it to a Queue. Once in the Queue, the message will be sent to one or more services. |
| OMB Routing Keys | List of OMB routing keys used to route OMB messages to OMB Service. Routing keys can be based on OMB Service IDs, OMB Service Types, OMB Message Types. |
| OMB Broker Queue Names | List of OMB queues that OMB Service uses |

Each service may be assigned a service ID and a service type. Service IDs can be mapped to DNS-SD service types and used to perform DNS-SD based discovery of OMB services (e.g. a particular type of oneM2M service or ETSI M2M service). The identifiers may be formatted and used such that additional DNS-SD service sub-types may also be defined to provide additional granularity (e.g., sub-services which can be mapped to capabilities of a service).

A DNS-SD SRV record will be created on the DNS-SD server 218 for each OMB service (e.g., location tracking device 220 or location tracking service 230) that is loaded into service directory 210 and optionally for individual features (e.g., location coverage of two separate areas) supported by an OMB service. SRV record syntax supports defining services as well as sub-services. This syntax can be used to specify features (as sub-services). DNS-SD interface 211 can then be used to perform DNS PTR record lookups to discover the list of available instances of a given service type (e.g., a particular oneM2M service or ETSI M2M service). The response to a DNS PTR lookup is a list of matching instance names. A DNS-SD PTR record for a service type instance may have the format service.proto.domain PTR instance.service.proto.domain. A DNS-SD PTR record for an OMB service sub-type instance may have the following format:

sub-service.service.proto.domain PTR instance.sub-service.service.proto.domain
  sub-service consists of an underscore character followed by the sub-service name (e.g., _hdr)
  service consists of an underscore character followed by the service protocol name (e.g., _etsiM2M). This field allows the searching entity to check which protocol is required to communicate with the service.
  proto consists of underscore and either "_tcp" (for application protocols that run over TCP) or "_udp" (for all others).
  domain specifies the DNS subdomain within which the service names are registered. It may be "local.", meaning "link-local domain", or it may be a non-local DNS domain name (e.g., "com")
PTR is a DNS keyword used in DNS PTR records
instance is a user-friendly name assigned to the service instance (e.g., name of an OMB service instance)

An example PTR record for an OMB service instance of type "etsiM2M" and instance name "nrar01" that is hosted in the domain named "example.com" is shown as follows:
nrar.etsiM2M._tcp.example.com. PTR nrar01._nrar._etsiM2M._tcp.example.com.

DNS-SD uses DNS SRV records to define the target host name or address and port where a service instance can be reached. Since IP-based addressing is not used between OMB services, the SRV record will not necessarily point the client to the discovered service. The SRV record can point the searcher to a list of address/port/protocol combinations that can be used to join the bus and communicate with one or more components of message bus backbone 202. OMB Client 222 of the searcher can use one of these address/port/protocol combinations to connect to message bus backbone 202 and communicate with a discovered service. An SRV record for a OMB service instance may have the format: service._proto.domain TTL class SRV priority weight port target. An SRV record for an OMB service sub-type instance has the format: sub_service._service._proto.domain TTL class SRV priority weight port target. The terms may be described as follows:
  sub_service: the symbolic name of the desired sub-service
  service: the symbolic name of the desired service.
  proto: the transport protocol of the desired service; this is usually either TCP or UDP.
  domain: the domain name for which this record is valid.
  TTL: standard DNS time to live field.
  class: standard DNS class field (this is always set to a value of 'IN' standing for 'Internet').
  priority: the priority of the target host, lower value means more preferred.
  weight: A relative weight for records with the same priority.
  port: the TCP or UDP port on which the service is to be found.
  target: the canonical hostname of the machine providing the service.

An example SRV record for an OMB service instance of type "etsiM2M" and instance name "nrar01" is: _etsiM2M._tcp.example.com. 86400 IN SRV 0 5 5060 nrar01.example.com.

DNS-SD TXT record for service directory 210 can also be created on the DNS-SD server for each OMB service (e.g., by the Admin Tool 250). DNS-SD uses DNS TXT records to store name/value pairs conveying additional information about the named service. Each name/value pair is encoded as its own constituent string within the DNS TXT record, in the form "name=value". Everything up to the first '=' character is the name. Everything after the first '=' character to the end of the string (including subsequent '=' characters, if any) is the value. From the standpoint of service directory 210, the DNS-SD TXT record can be used to store useful attribute information of an OMB service. For example, a DNS-SD TXT record could include attribute name/value pairs such as follows:
  SERVICE_ID=12345
  SERVICE_TYPE=NAE
  SERVICE_NAME=NAE01
  BROKER_IP_OPTION_1=172.25.0.230
  BROKER_PORT_OPTION_1=5672
  OMB_PROTOCOL_TYPE_OPTION_1=AMQP
  BROKER_IP_OPTION_2=172.25.0.231
  BROKER_PORT_OPTION_2=5673
  OMB_PROTOCOL_TYPE_OPTION_2=HTTP
  SELF_EXHANGE_NAME=NAE01_EX
  SELF_ROUTING_KEY=NAE01_RK
  SELF_QUEUE=NAE01_Q
  SD_EXCHANGE_NAME=SD01_EX
  SD_ROUTING_KEY=SD01_RK
  GDI_EXCHANGE_NAME=GDI01_EX
  GDI_ROUTING_KEY=GDI01_RK
  REQD_SERVICES=SD,GDI,NRAR,NSEC,NHDR OMB service configuration refers to the process whereby a service (e.g., location tracking device 220) provides an OMB client (e.g., OMB client 222) with information about itself so that it can connect with and communicate on message broker 203. The information that is provided during configuration is shown in Table 1 (above). The architecture discussed herein supports multiple methods for OMB service configuration. A first method relies solely on the use of a configuration file. A second method relies on a configuration file coupled with a DNS TXT record lookup. For the first method, all of this information is contained within a file for OMB service configuration that is stored within the service (e.g., location tracking service 230). In an example, location tracking device 220 passes this configuration file to OMB client 222 via an API call. When the first method is used, the ombConfig( ) API call results in no operations on message broker 203; the file is simply passed to OMB client 222. However, once OMB client 222 is configured with information about location tracking device 220, location tracking device 220 may use the ombRegister( ) API call to register with portions of the message bus backbone 202 (e.g., message broker 203). The ombRegister( ) API and ombConfig( ) API is discussed in more detail herein in tables and in the discussion with regard to the call flow of FIG. 12.

For the second method, the information in Table 1 is stored in two separate files. A first file stores the DNS information (first 4 rows of Table 1) and stored within the service (e.g., location tracking device 220). In an example, location tracking device 220 passes this first file to OMB client 222, which may be done via the ombConfig( ) API call. The rest of the information is stored within a DNS TXT record which is provisioned in service directory 210. OMB Client 222 retrieves the rest of the information via a DNS TXT record lookup.

It is understood that the entities performing the steps illustrated in FIG. 10-FIG. 15 may be logical entities. The steps may be stored in a memory of, and executing on a processor of, a device, server, or computer system such as those illustrated in FIG. 17C or FIG. 17D. In an example, with further detail below with regard to the interaction of M2M devices, location tracking service 230 and location tracking device 220 of FIG. 11 may reside on one or more M2M terminal device 18 of FIG. 17A, while message broker 203, Service Directory 201, and DNS-SD server 211 and OMB AP Interface 212 of FIG. 11 may reside on M2M gateway device 14 of FIG. 17A. This is just one example.

Figure 10:
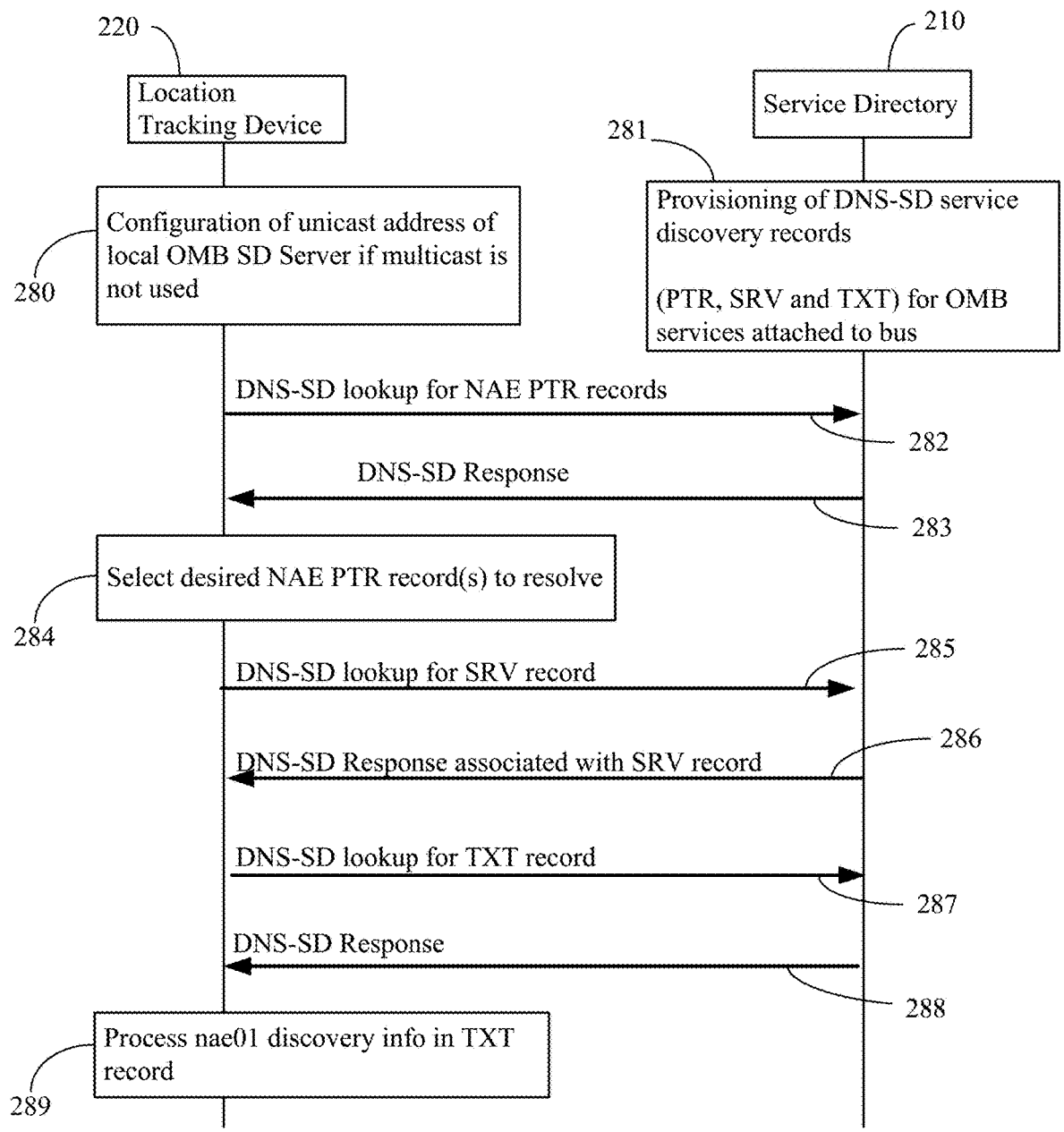
FIG. 10 illustrates an exemplary DNS-SD based service discovery message flow.

FIG. 10 is an exemplary illustration of a process by which a service (e.g., location tracking device 220) uses DNS-SD to browse service directory 210. In this example, location tracking device 220 searches for an ETSI network application enablement (NAE) service. In a oneM2M example, location tracking device 220 searches for an oneM2M device management (DMG) service. At step 280, location tracking device 220 is configured with unicast address of local service directory server (e.g., service directory 210), if multicast is not used. At step 281, service directory 210 has DNS-SD service discovery records (PTR, SRV, and TXT) provisioned for services attached to message broker 203. At step 282, location tracking device 220 sends a DNS-SD lookup for NAE PTR records. At step 283, service directory 283 sends DNS-SD response (e.g., ane01._nae._etsiM2M._tcp.com) to location tracking device 220. At step 284, location tracking device 220 selects desired NAE PTR record(s) to resolve. At step 285, location tracking device 220 sends a DNS-SD lookup for SRV record (e.g., nae01.nae._etsiM2M._tcp.com) for the selected service. At step 286, service directory 210 sends a DNS-SD response (e.g., SRV record containing nae01.example.com FQDN, nae01._nae._etsiM2M._tcp.com). This SRV record provides location tracking device 220 with a list of address/ port/protocol combinations that can be used to join the bus and communicate with the OMB. At step 287, location tracking device 220 sends a DNS-SD lookup for TXT record (e.g., nae01.example.com). The DNS TXT record provides location tracking device 220 with name/value pairs conveying additional information about the service. At step 288, service directory 210 sends DNS-SD response (e.g., TXT record containing discovery info for nae01). At step 289, location tracking device 220 processes discovery info (e.g., nae01) in the received TXT record.

Generally the steps of FIG. 10 may be thought of as follows: At step 280, location tracking device 220 is pre-provisioned with the address of the service directory 210. At step 281, service directory 210 is pre-loaded with records that can be discovered. At step 282, location tracking device 220 asks service directory 210 if it knows about any NAE services. At step 283, service directory 210 provides location tracking device 220 with a list of pointers. There will be a pointer for each NAE service that service directory 210 knows about. Each pointer tells location tracking device 220 where it can go to find more information about an instance of the NAE service. At step 284, location tracking device 220 picks a pointer. At step 285, the pointer can be used to retrieve an SRV record for a service (e.g., location tracking service 230). The SRV record provides details about the service. Specifically, it tells where the service can be reached. At step 286, the SRV record is provided to location tracking device 220. At step 287, location tracking device 220 fetches a TXT record for the service. The TXT record can be a customized record that gives more details about the service. At step 288, the TXT record is sent to location tracking device 220. At step 289, the TXT record is analyzed and location tracking device 220 decides if it wants to use the service.

In summary with regard to the aforementioned steps of FIG. 10, assuming that location tracking device 220 is interested in communicating with a discovered service, location tracking device 220 can decide to join message bus backbone 202. OMB client 222 of location tracking device 220 can obtain a set of IP Address/Port Number/Protocol combinations from the discovered service's TXT file that may be used to access a portion of message bus backbone 202 (e.g., message broker 203). The TXT file can also indicate what queue can be used to access the discovered service.

FIG. 7 is an exemplary illustration of a message bus database service. Database service 240 may provide database services to other services connected with message broker 203. Database services 240 may be one of the other services 204 as illustrated in FIG. 5. FIG. 7 shows that the database services 240 is designed comprising Generic Database Interface (GDI) service 242. Generic Database Interface (GDI) is a common application interface to multiple databases, providing capabilities of database access and data management. Portions (e.g., RDBMS 245 and DBMS 246) of database service 240 are largely unaware of message bus backbone 202 as discussed herein. GDI service 242 is designed to interface to the OMB API's that are listed in Table 4. In FIG. 7, for example, OMB client 244 utilizes an AMQP interface 243. However, OMB client 244 can alternatively be used based on a different interface (e.g., HTTP), as OMB API 241 would remain unchanged.

Figure 9:
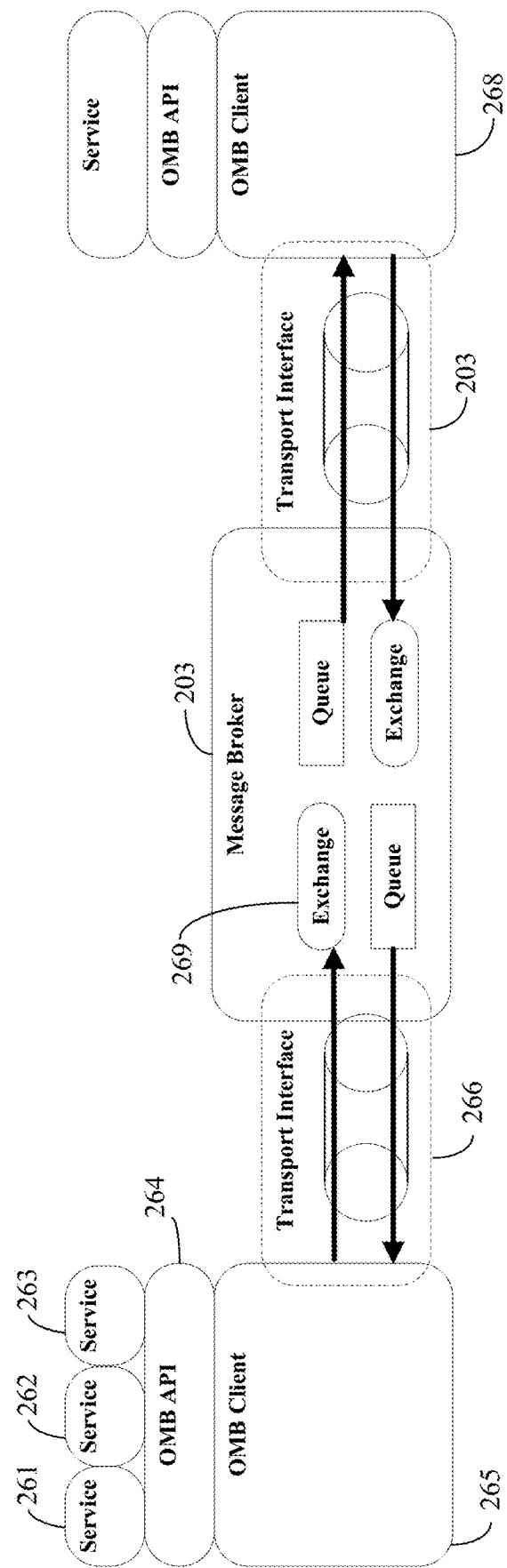
FIG. 9 illustrates exemplary end-to-end communication of an open message bus architecture with a Service/OMB AP/OMB Client relationship.

FIG. 9 is an exemplary illustration of how end-to-end communication between services connected to message broker 203 can work. Each service interfaces to its local OMB client. FIG. 9 shows that OMB client 265 and OMB client 268 interface to the broker via transport interface 266 and transport interface 267, respectively. OMB client 265 and OMB client 268 may use a different transport interface. For example, OMB client 265 may interface to the message broker 203 via AMQP, while OMB client 268 interfaces to the message broker 203 via WebSockets. Each service may use one or more Exchanges (e.g., exchange 269) hosted on message broker 203 to receive messages from other services (e.g., x-nrar). Each service may bind its exchange(s) with its queue(s). A binding provides an exchange with the name(s) of service's queue(s) (e.g., q-nsec). This name is used by the exchange to route messages. Each service uses one more queues hosted on message broker 203 to receive messages from other services. Each OMB client (e.g., OMB client 265 and OMB client 268) only requires a single transport connection to message broker 203. Message broker 203 supports sending (producing) and receiving (consuming) of messages multiplexed over this single transport connection using communication channels.

Referring again to FIG. 5, the discovery architecture that is built into message bus backbone 202 allows services to browse available services before registering with message bus backbone 202 and communicating via message broker 203. In an example, a lightweight location tracking sensor (e.g., location tracking device 220) that communicates via CoAP would like to discover a location tracking service (e.g., location tracking service 230) that it can use to upload its GPS coordinates. The location tracking service that the tracking sensor will discover communicates via WebSockets. This use case is illustrated by an exemplary call flow as shown in FIG. 11 and with reference to FIG. 5.

Figure 11:
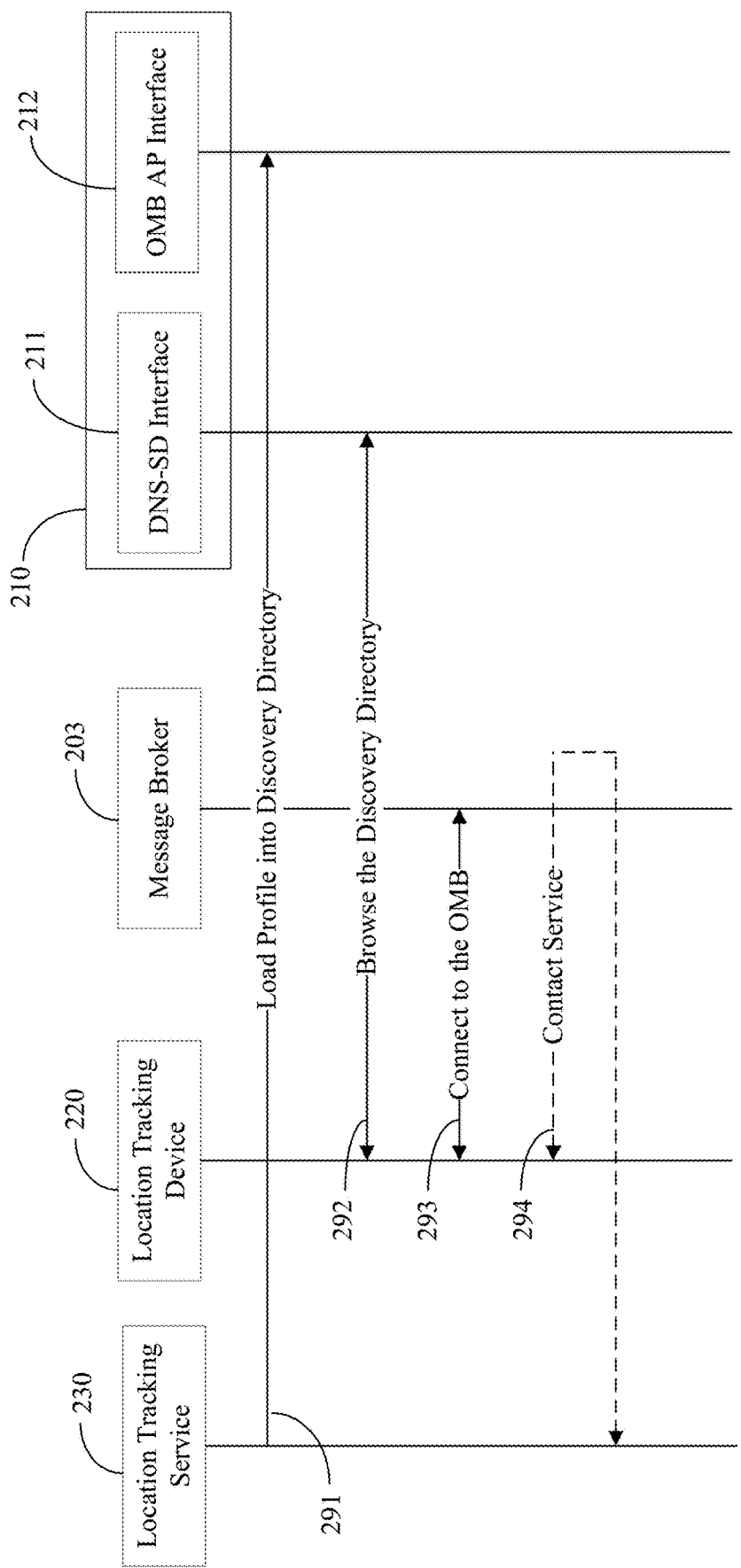
FIG. 11 illustrates an exemplary overview of messaging using one or more components of an open message bus architecture.

With further details discussed herein, FIG. 11 generally discusses DNS-SD discovery followed by registration to a message bus and service utilization. At step 291, location tracking service 230 may publish its service profile via an OMB API to service directory 210. At step 292, location tracking device 220 browses the service directory 210 using DNS-SD interface 211. At step 293, location tracking device 220 decides to connect with message broker 203, which may be because of the presence of location tracking service 230. At step 294, location tracking device 220 makes contact with location tracking service 230 via message broker 203.

Figure 12:
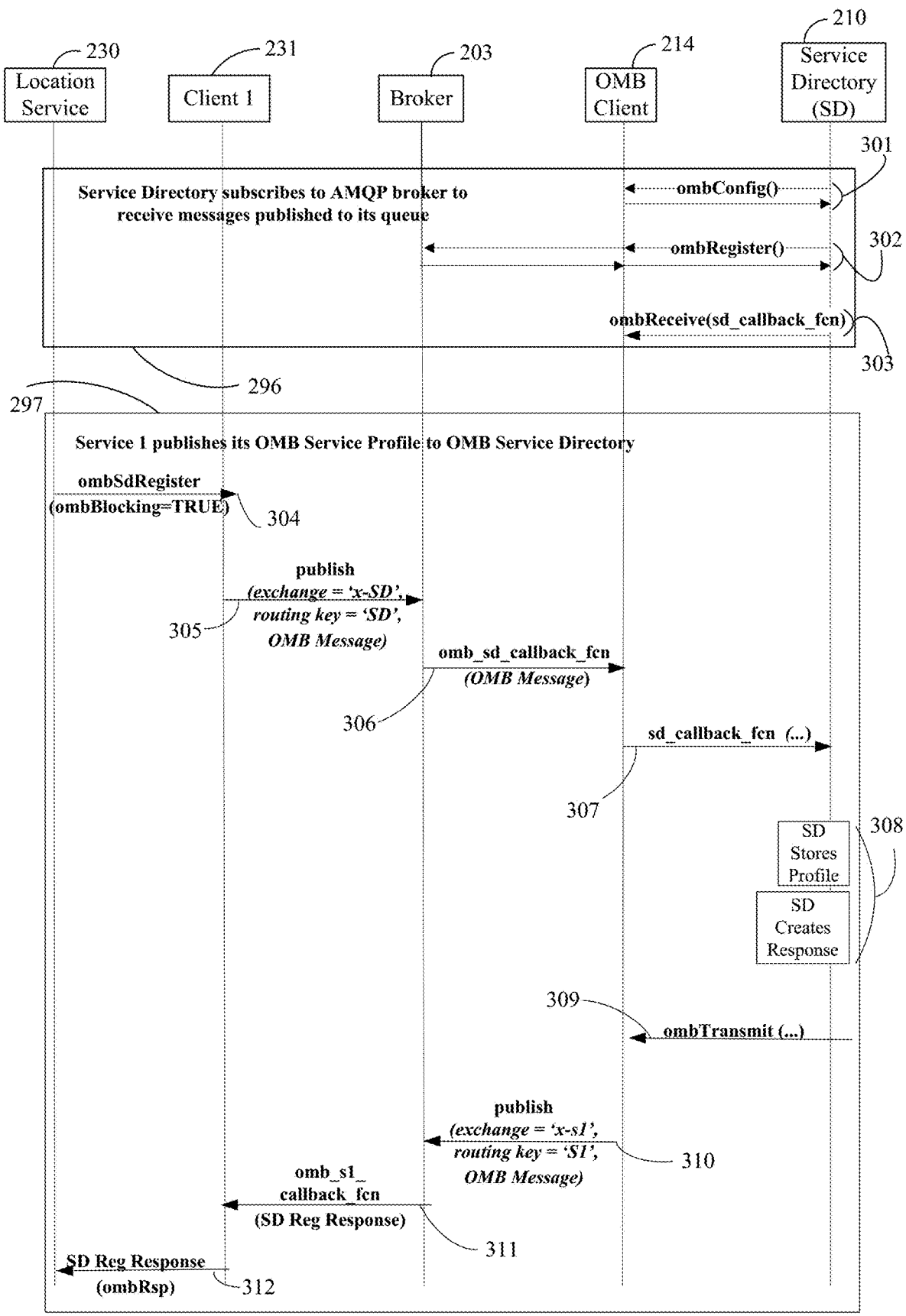
FIG. 12 illustrates an exemplary message flow for publishing of service discovery info to a service directory.

FIG. 12 illustrates a more detailed example of publishing of service discovery info to a service directory. In summary, with reference to FIG. 12, which details step 291 of FIG. 11, location tracking service 230, which is already connected to message broker 203, publishes its profile into service directory 210 so that it (location tracking service 230) can be discovered by other services. Once the service profile of location tracking service 230 is in service directory 210, it may be discovered by other services. Services such as location tracking, billing, image processing, and telemetry may use this procedure to publish their profiles in service directory 210, for example. A profile may contain information, such as ombServiceID, ombServiceType, and broker contact address. In the location tracking service 230 example, ombServiceID is an identifier that identifies location tracking service 230 that is connected with message broker 203. The ombServiceType is an identifier that identifies the type of service. In this example, it will identify that location tracking service 230 provides location services. A broker contact address may be the URI, IP address, or port number that a service may use to contact and join one or more portions of message bus backbone 202. There may be a set of contact addresses. Each address may be used for a different transport protocol. For example, there may be an AMQP URI, WebSockets URI, and a MQTT URI. Alternatively, these URIs could be provided by service directory 210

With further reference to FIG. 12, block 296 is an example of a service directory subscribing to AMQP broker to receive messages published to its queue, which is an operation that typically occurs at start-up (e.g., initialization steps). At step 301, ombConfig( ) API call is sent to OMB client 214. In this step, service directory 210 is configuring its OMB client 214 with its configuration file. At step 302, ombRegister( ) API call is sent from service directory 210 in order to register its ServiceID with one or more components of message bus backbone 202. One or more components of message bus backbone 202 may create message queues for service directory 210. At step 303, with an ombReceive( ) (sd_callback_fcn) API call, service directory 210 informs OMB client 214 of what to do when a message is received from message broker 203. The sd_callback_fcn is a pointer to the function that should be called to handle the received message.

Block 297 of FIG. 12 illustrates an example flow of a service publishing its OMB service profile to a service directory. At step 304, via an ombSdRegister( ) API call, location tracking service 230, requests that its profile be loaded into service directory 210. At step 305, OMB client 231 of location tracking service 230 publishes to an ombSdRegister registration message to message broker 203 of service directory 210. At step 306, message broker 203 uses a callback function to forward the message to OMB client 214 of service directory 210. Message broker 203 was previously configured with the call back function, this step is not shown. At step 307, OMB Client 214 uses the sd_callback_fcn pointer that was provided in step 303 to call the service directory function that is responsible for handling the new service registration. The message of step 307 may look like the following: sd_callback_fcn (ombMsgID=1234, ombRxServiceID=S1, ombMsgType=SD Reg Request, ombRxMsgPayload=SD Profile). At step 308, the profile may be stored and a response created using service directory 210. At step 309, using an ombTransmit( ) API call, service directory 210 sends a message back to the new service informing it that its registration request was successful. The message of step 309 may look like the following: ombTransmit (ombBlocking=FALSE, ombTarget=S1, ombMsgID=1234, ombTxMsgPayload=SD Reg Response). At step 310, OMB client 214 publishes the message of step 309 to message broker 203. At step 311, message broker 203 forwards the message of step 309 to OMB client 231. At step 312, OMB client 231 forwards the message of step 309 to location tracking service 230.

Figure 13:
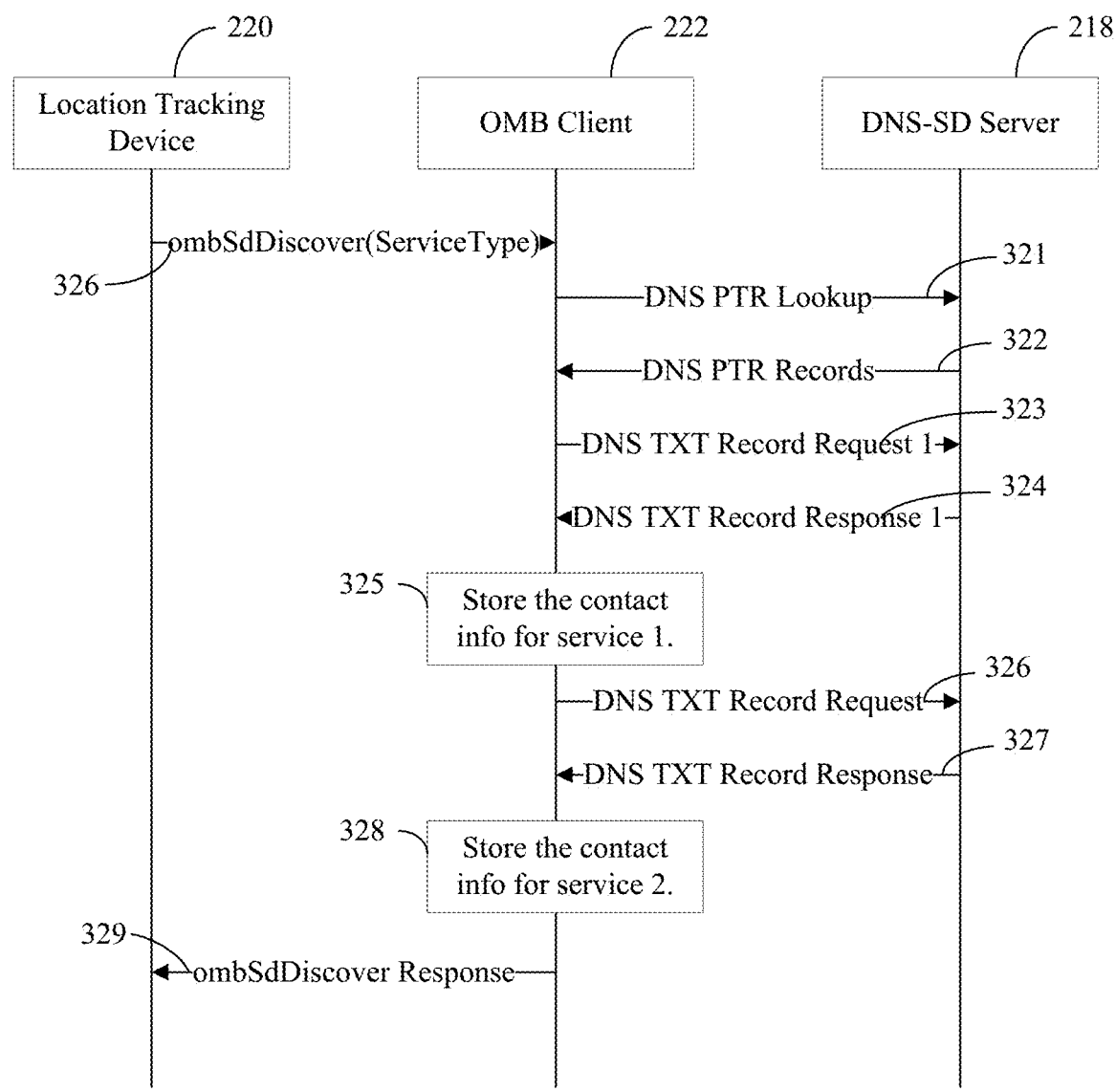
FIG. 13 illustrates an exemplary message flow for DNS-SD based discovery.

FIG. 13 illustrates a more detailed example of DNS-SD based discovery. In summary, with reference to FIG. 13, which details step 292 of FIG. 11, location tracking device 220, which may not yet be connected with message broker 203, may query DNS-SD server 218 to check if message broker 203 has a location tracking service available. DNS-SD server 218 may provide location tracking device 220 with an AMQP URI of message broker 203 and a OMB-ServiceId of location tracking service 230 or the ombServiceType of location tracking service 230 that can be found connected with message bus 203. Optionally, when location tracking device 220 makes its DNS-SD query, location tracking device 220 may indicate what type of transport it supports (e.g., AMQP) and DNS-SD server 218 may use this information to determine what IP address, port number, or protocol information should be included in the TXT record. Once location tracking device 220 selects a service (e.g., location tracking service 230) that it wants to use, it will use the DNS TXT file of location tracking service 230 to learn how to contact and use the service. ombServiceID is an identifier that identifies location tracking service 230 that is connected with message broker 203. ombServiceType is an identifier that identifies the type of service. In this example, it will identify that location tracking service 230 provides location services. The TXT file will include a broker contact address. The BROKER_IP, BROKER_PORT, and OMB_PROTOCOL_TYPE indicate the contact address and messaging protocol. The TXT file may include multiple contact addresses and protocols so that location tracking device 220, which performs discovery, can choose what protocol it will use to contact message broker 203. Location tracking device 220 learns the associated SERVICE_ID from the DNS TXT file. The SERVICE_ID may be used by location tracking device 220 to contact the location tracking service 230 when connects with one or portions of message bus backbone 202.

With further reference to FIG. 13, the interaction between OMB client 222 and DNS-SD server 210 does not occur over message broker 203, rather it is over a separate DNS-SD interface 211. Alternatively, if OMB Client 222 did not support a DNS-SD interface, then the location tracking device 220 may support DNS-SD and query DNS-SD server 210. As follows are details with regard to DNS-SD discovery. At step 320, location tracking device 220 may request that OMB client 222 use its DNS-SD interface 211 to browse service directory 210 for a particular type of service. The ombSdDiscover( ) API call which is defined herein may be used to make the request to OMB Client 222. An alternative to step 320, OMB client 222 may be provisioned with contact information for multiple DNS-SD servers so that it can perform the search on multiple servers.

At step 321, as discussed in more detail herein, OMB client 222 makes a PTR record request to DNS-SD server 218. At step 322, DNS-SD server 218 responds with 0-N serviceId' that matches a requested ServiceType. At step 323, OMB client 222 requests the TXT record that is associated with a first service in the list that was provided in step 322. At step 324, DNS-SD server 218 responds with the TXT record for the first service. At step 325, OMB client 222 stores the TXT record for the first service. At step 326, OMB client 222 will request the TXT record that is associated with the Nth service in the list that was provided in step 322. At step 327, DNS-SD server 218 responds with the TXT record for the Nth service. At step 328, OMB client 222 stores the TXT record for the Nth service. At step 329, OMB client 222 provides the location tracking device 220 with a list of discovered services by responding to ombSdDiscover( ) API, which is discussed herein.

Figure 14:
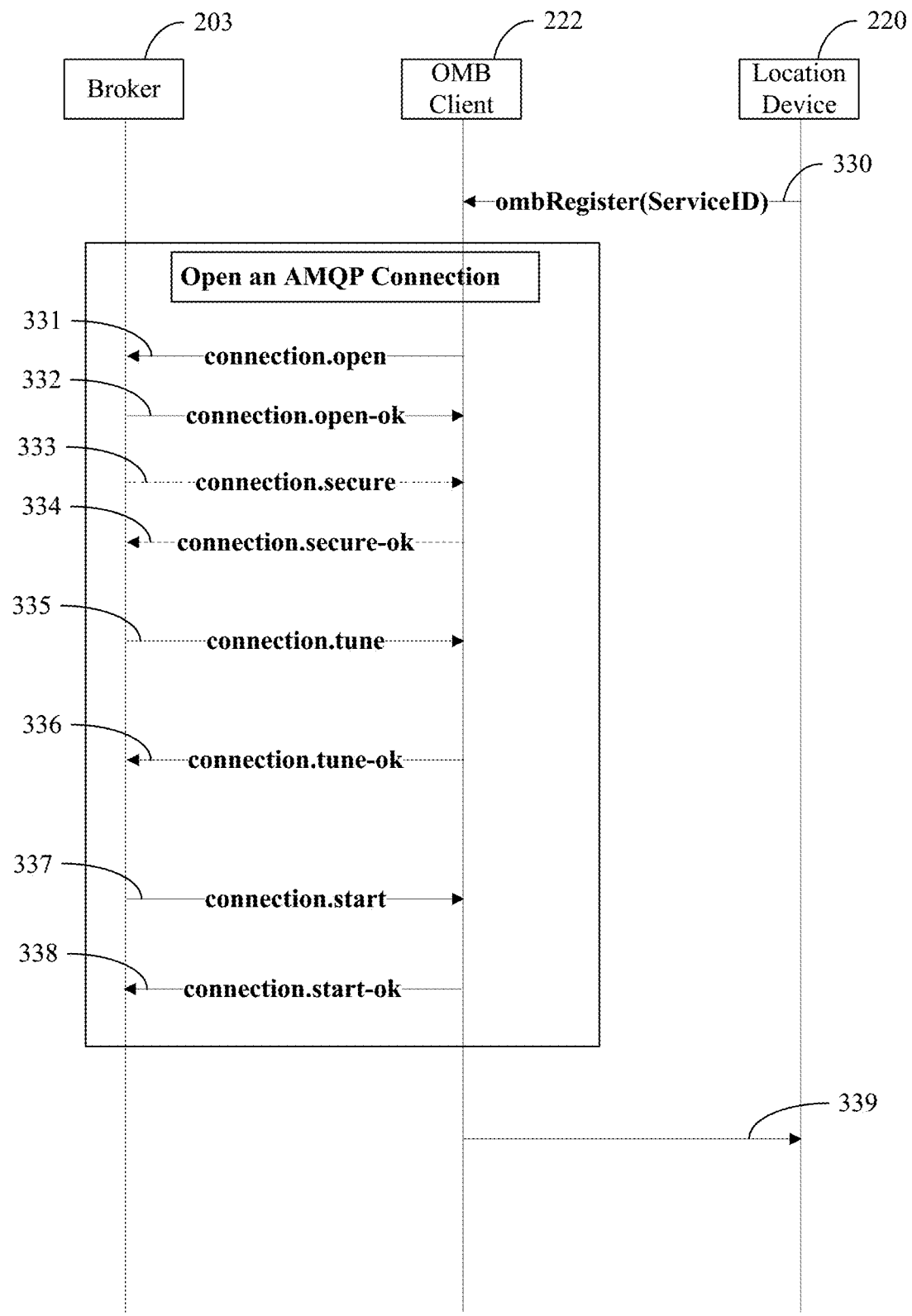
FIG. 14 illustrates an exemplary message flow of opening an AMQP connection.

FIG. 14 illustrates a more detailed example method flow for connecting with message broker 203 or other portions of message bus backbone 202. In summary, with reference to FIG. 14 which details step 293 of FIG. 11, location tracking device 220, may decide to join with one or more components of message bus backbone 202 (e.g., message broker 203). Location tracking device 220 may use the broker contact address that was discovered in the previous steps in order to open a connection (e.g., an AMQP connection) with message broker 203. As follows are details with regard to connecting with message broker 203. At step 330, location tracking device 220 uses the ombRegister( ) API to request that OMB client 222 connect with message broker 203. At step 331, assuming that the OMB client 222 is designed with an AMQP transport interface, the OMB client 222 uses the AMQP URI to contact message broker 203 and request that a connection be opened. The AMQP URI may have been obtained during the discovery process that is described with regard to step 292 of FIG. 13. OMB Client 222 may be designed to use other transport interfaces (e.g., CoAP, etc.). This example covers the case where the underlying transport is AMQP.

At step 332, the AMQP interface to message broker 203 responds to the request of step 331. At step 333, security is established on the AMQP connection (e.g., security challenge). OMB client 222 uses the connection parameters from the TXT record that was obtained during DNS-SD lookup. At step 334, security is established on the AMQP connection (e.g., security response). At step 335, AMQP connection is configured (e.g., proposed max channels, proposed max frame size, desired heartbeat delay, etc.). OMB client 222 uses the connection parameters from the TXT record that was obtained during the DNS-SD lookup. At step 336, AMQP connection is configured (e.g., negotiated max channels, negotiated max frame size, negotiated heartbeat delay, etc.). At step 337, AMQP of message broker 203 acknowledges that the connection has been established (e.g., protocol version, server properties, available security, etc.). At step 338, AMQP of OMB client 222 acknowledges that the connection has been established (e.g., selected security, client properties, etc.). At step 339, OMB client 222 responds to the ombRegister( ) request of step 331. The response may contain an indication of whether or not the registration request was successful, rejected, or caused an error.

Figure 15:
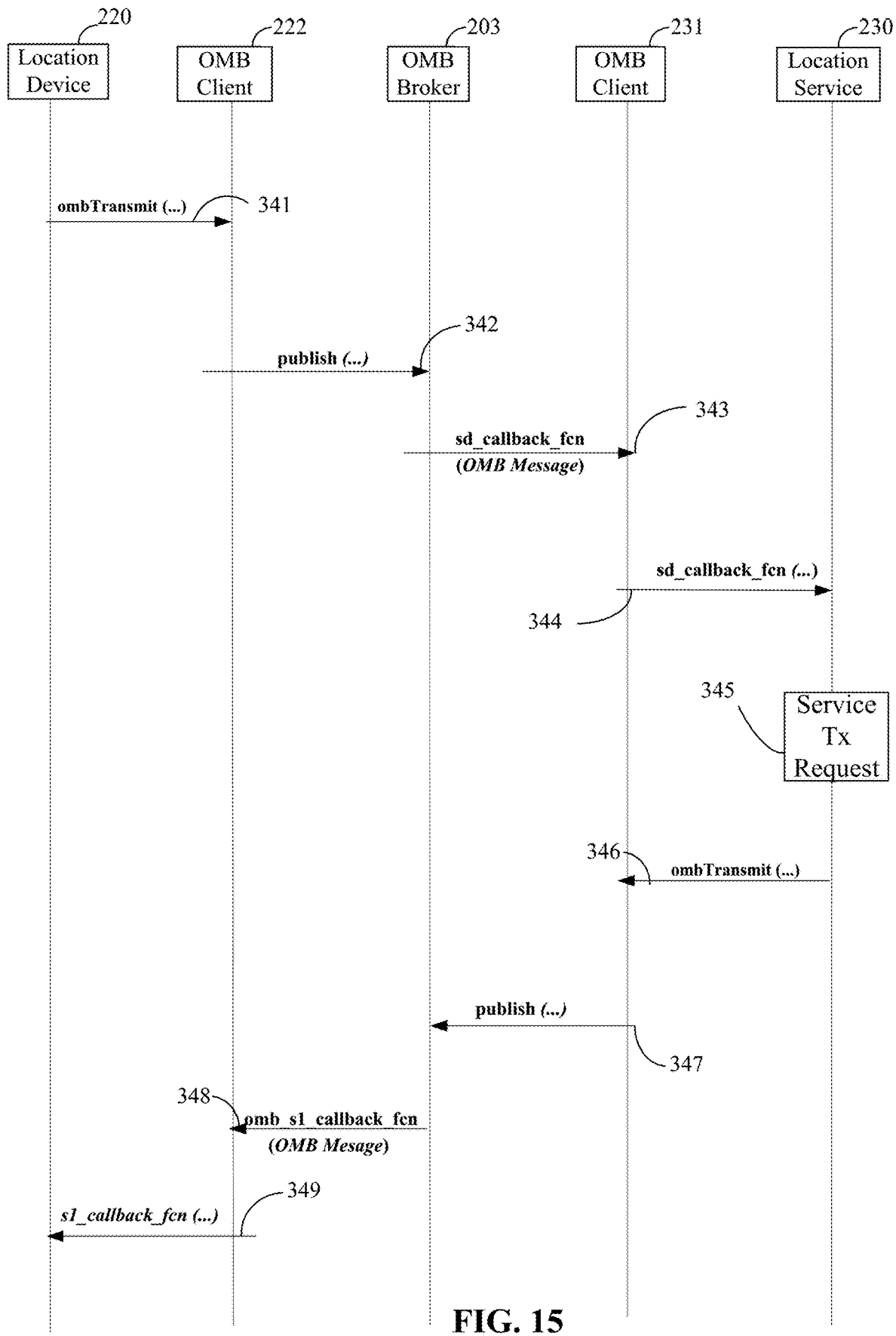
FIG. 15 illustrates an exemplary method flow for communicating with a discovered service using one or more components of message bus backbone.

FIG. 15 is an exemplary method flow for communicating with a discovered service using one or more components of message bus backbone 202 (e.g., message broker 203). In summary, location tracking device 220 uses the ombServiceID that was discovered to send a message to the location tracking service 230. Note that the OMBServiceID or ombServiceType that was discovered is used. At step 341, the location tracking device 220 sends a message (e.g., the ombTransmit( ) API call) intended for location tracking service 230 that was discovered earlier. The message of step 341 may look like the following: ombTransmit (ombBlocking=False, ombTarget=S2, ombToken=ABC, ombTxMsgPayload ombCallbackFcn=S1_callback_fcn). The OMBServiceID that was discovered earlier may be used to identify the targeted location tracking service 230. In FIG. 15, location tracking service 230 is called S2 (service 2), while location tracking device 220 is called S1 (service 1). At step 342, OMB client 222 publishes the message of step 341 to message broker 203. The message of step 342 may look like the following: publish (exchange='x-s2', routing key='S2', OMB Message). At step 343, message broker 203 forwards the message of step 341 to OMB client 231. At step 344, OMB client 222 forwards the message to location tracking service 230. The message of step 344 may look like the following: sd_callback_fcn (ombMsgID=1234, ombToken=ABC, ombRxServiceID=S1, ombMsgType=Tx Request, ombRxMsgPayload=Tx payload). At step 345, location tracking service 230 processes the message of step 341. At step 346, location tracking service 230 responds to the request by using the ombTransmit API. Location tracking service 230 may identify the service that it is responding to by using the same service ID that was provided by the sd_callback_fcn in step 344. The message of step 346 may look like the following: ombTransmit (ombBlocking=FALSE, ombTarget=S1, ombMsgID=1234, ombToken=ABC, ombTxMsgPayload=Tx Response). At step 347, OMB client 231 publishes the message to message broker 203. The message of step 347 may look like the following: publish (exchange='x-s1', routing key='S1', OMB Message). At step 348, message broker 203 forwards the message of step 346 to OMB client 222. At step 349, OMB client 222 forwards the message of step 346 to location tracking device 220, which processes the request. The message of step 349 may look like the following: s1_callback_fcn (ombRspCode, ombRxMsgType=Tx_Rsp, ombToken=ABC, ombRxMsgPayload).

Figure 1:
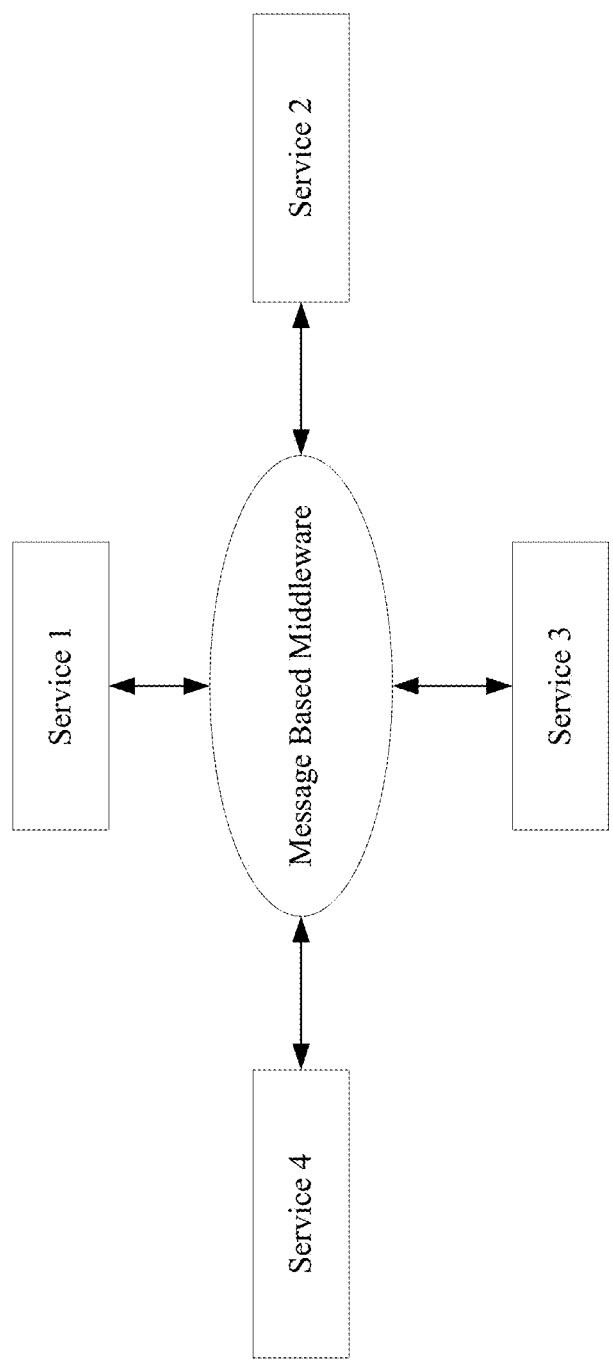
FIG. 1 illustrates an exemplary high level representation of message based middleware.
Figure 2:
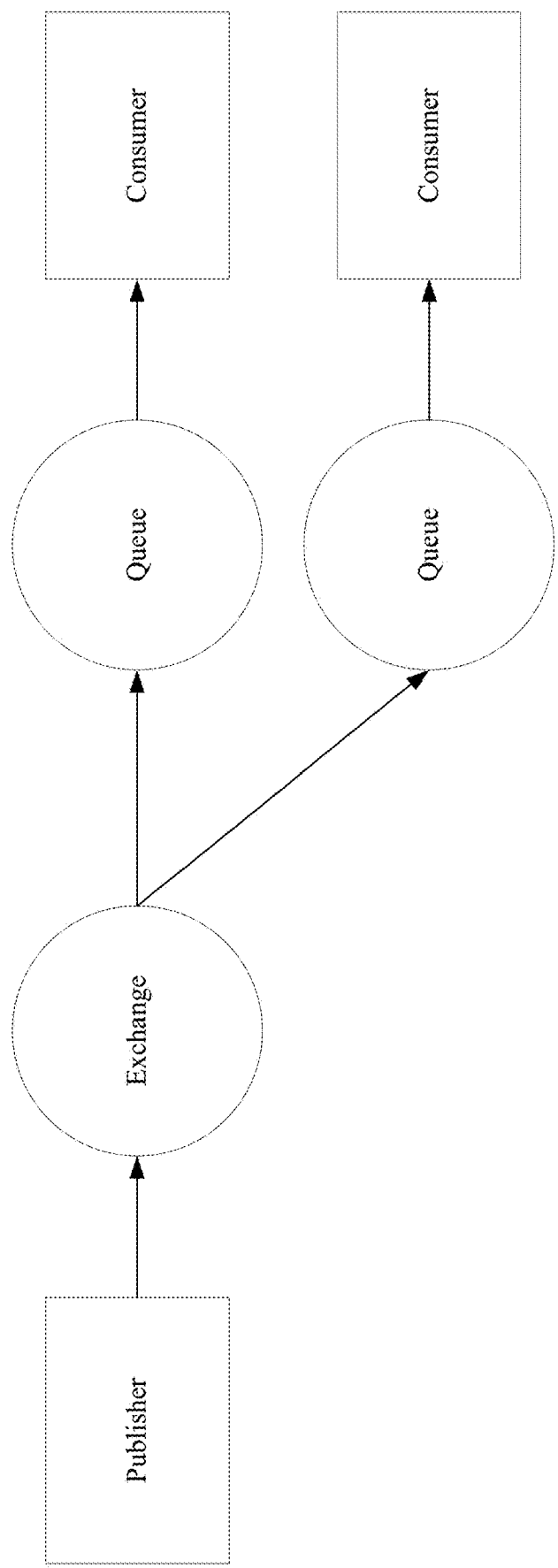
FIG. 2 illustrates an exemplary relationship between AMQP Exchanges and Queues.
Figure 3:
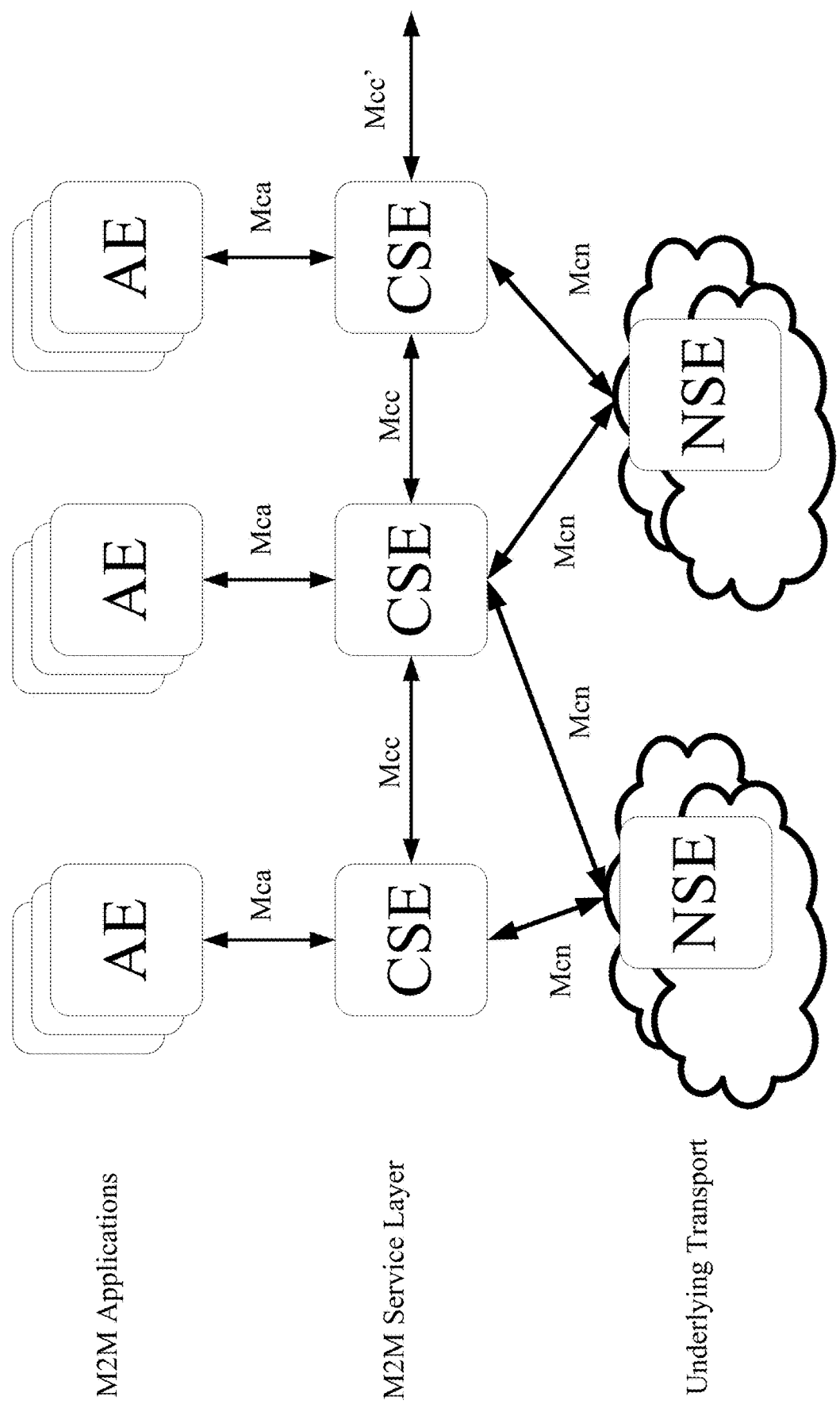
FIG. 3 illustrates an exemplary oneM2M functional architecture.
Figure 4:
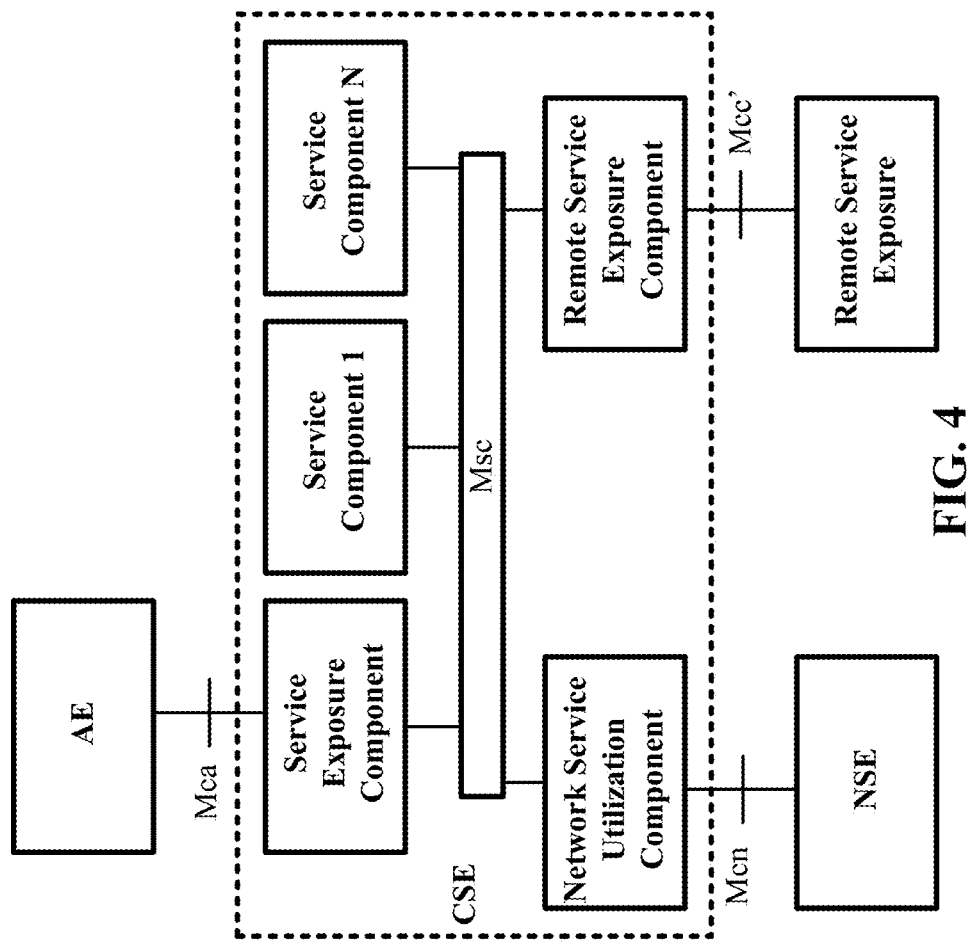
FIG. 4 illustrates an exemplary oneM2M functional architecture.
Figure 16:
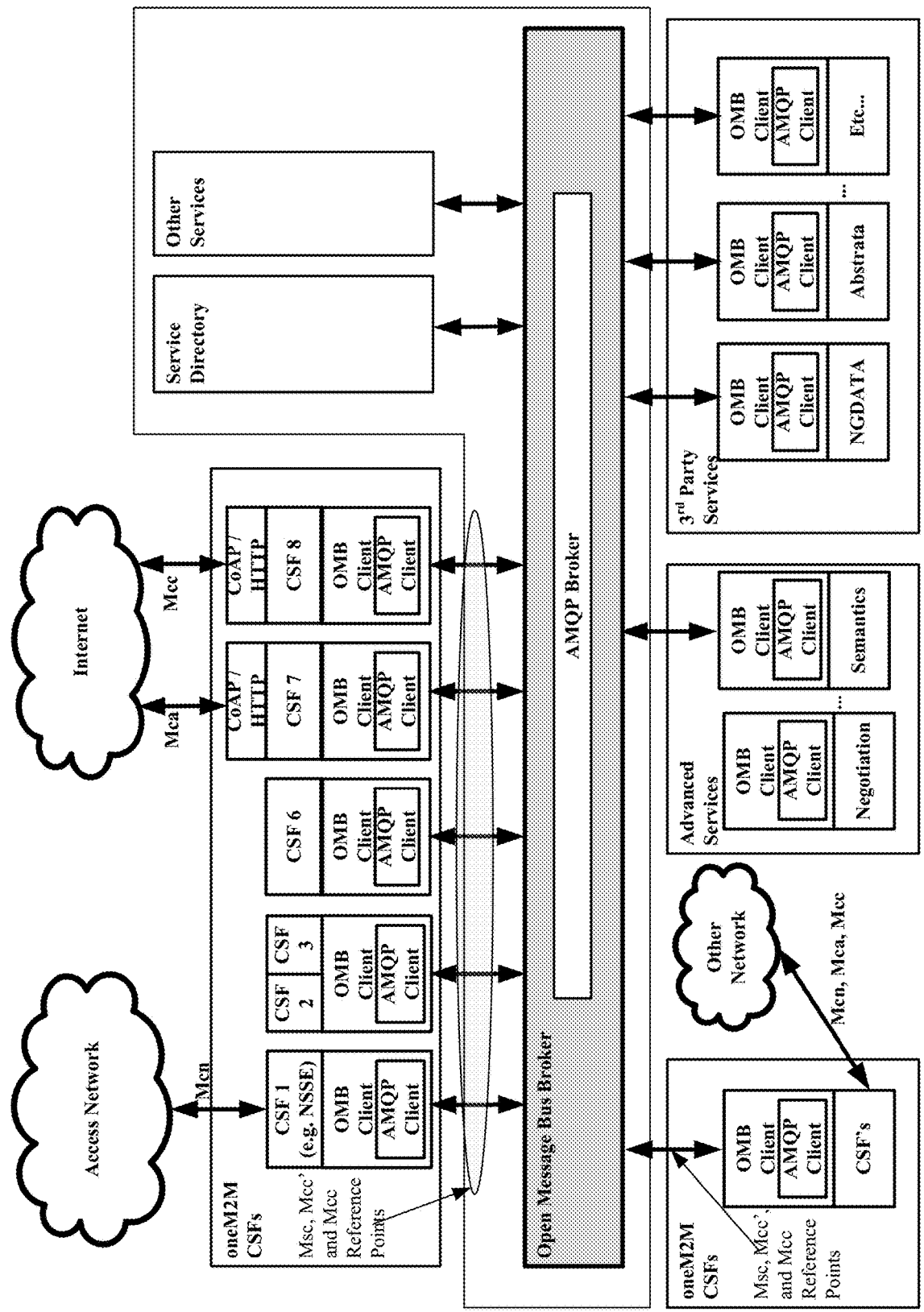
FIG. 16 illustrates an exemplary implementation of how oneM2M Services (CSF's) or service components (e.g., a group of services) may be deployed using the OMB architecture.

FIG. 16 illustrates an exemplary implementation of how oneM2M Services (CSF's) or service components (e.g., a group of services) may be deployed using the OMB architecture discussed herein. Notice that each service can be deployed with its own OMB client (CSF 1 and CSF 6). Notice that multiple services may share an OMB client (CSF 2 and CSF 3). The Mcc, Mca, and Mcn reference points may not traverse the message bus broker. They may be routed directly to the Internet in order to reach a remote service, application, or external network respectively. The Msc reference point may be mapped, or bound, to the OMB (refer to FIG. 4 for another figure that demonstrate how the Msc reference point connects services). Note that the CSF's and OMB clients may be deployed on the same network server or on separate remote network servers.

Discussed herein are details with regard to OMB API (e.g., OMB API 225, OMB API 214, etc.) that may assist in allowing for transport agnostic connection of services with message broker 203. Once connected with message broker 203, OMB API 225 can be used to exchange messages with other services connected with message broker 203. Message broker 203 acts as a broker, so passes messages between clients. The following features may be supported by an OMB API: 1) independent and agnostic of underlying transport protocol, 2) independent and agnostic of overlying service protocol, 3) supports blocking and non-blocking functionality, and 4) based on object-oriented principles. As stated, OMB API 225 is independent and agnostic of the underlying OMB transport protocol (e.g. message passing, AMQP, XMPP, MQTT, Web Sockets, etc.). The underlying transport may be hidden by OMB client 222. OMB API 225 is independent and agnostic of the overlying service protocol using message broker 203. Each overlying service (e.g. oneM2M Services, ETSI M2M Services, etc.) that uses OMB API 225 is expected to be bound to OMB API 225. Thus, OMB API is independent of the payload format that the services use. For example, services can use XML, JSON, custom format, etc.

OMB API 225 supports blocking and non-blocking functionality. In order to support non-blocking functionality, OMB API (e.g., OMB API 225) allows a callback function to be provided to OMB client 222. Messages can be placed on message broker 203 and the callback function can be called by OMB client 222 when a response is received. The design of OMB API 225 is based on object-oriented principles and designed as a library.

OMB APIs supports different types of functionality. In a first example, services (e.g. location tracking device 22) are able to configure OMB client 222 based on corresponding OMB service configuration settings (see Table 1). In a second example, location tracking service 230 may initiate a connection or registration between OMB client 225 and message broker 203. This results in configuring message broker 203 based on corresponding OMB service configuration settings (e.g., create/configure necessary message broker constructs such as exchanges, queues, bindings). In third example, an OMB service (e.g., location tracking device 220) may discover other available OMB services (e.g., location tracking service 230) connected to message broker 203 via service directory 210. In fourth example, an OMB service may create/retrieve/update/delete information stored in database service 240. In a fifth example, an OMB service may send or receive messages over message broker 203. In a sixth example, an OMB service may provide management or debug information about itself to administration services 250. In a seventh example, administration services may be used to manage an OMB service. In an eighth example, an OMB service may subscribe to OMB service directory and specify notification criteria (e.g., if/when a specific type of service connects with message broker 203). In a ninth example, an OMB service may initiate a disconnection or deregistration between an OMB client (e.g., OMB client 222) and message broker 203.

Services that connect with message broker 203 or another portion of message bus backbone 202 may us an OMBServiceID. The OMBServiceID is an identifier that is assigned by one or more components of message bus backbone 202. OMBServiceID is used to identify each service on the bus. The OMBServiceID may be provisioned into the service or it may be assigned at registration to message bus backbone 202. A service may connect with message bus backbone 202 and provide no services to other services. However, such a service would still be assigned an OMBServiceID so that it can communicate on the bus. An example of a "service" that provides no services may be an alarm service (e.g., a siren device) that simply collects information from other services and triggers an alarm.

Services may also be assigned an ombServiceType. The ombServiceType identifies the type of service. For example, the ombServiceType may indicate that the associated service is a sensor or the associated service is for image processing. The ombServiceType may be provisioned into the service or it may be assigned at registration to one or more components of message bus backbone 202. The OMBServiceID and ombServiceType are used by services to discover and address other services. For example, the OMBServiceID can be used to send a message to a particular instance of a service and the ombServiceType can be used to subscribe to all messages related to a particular service type. An example call flow is discussed herein. OMB clients may be assigned additional, optional identifiers, such as an ombGroupId. Multiple ombGroupId's may be assigned to each OMB client. The ombGroupId may be used to group clients based on ownership, cost, type, access rights, etc.

Further descriptions of OMB API are discussed herein. The following are categories in which the function calls supported by OMB API 225 or the like may be grouped: 1) General OMB API functions used to communicate over message broker (shown in Table 2); 2) OMB service directory API functions (shown in Table 3); 3) OMB Database API functions (shown in Table 4); and 4) OMB Admin Console API functions.

TABLE 2

General OMB API Functions

| Function | Description |
| --- | --- |
| ombConfig( ) | Called by OMB service to configure the OMB Client |
| ombRegister( ) | Called by OMB service to register to Message broker |
| ombDeregister( ) | Called by OMB service to deregister from Message broker |
| ombReceive( ) | Called by OMB service to register a callback function for the servicing of specific OMB message types |
| ombTransmit( ) | Called by OMB service to transmit OMB messages |

TABLE 3

OMB Service Directory API Functions

| Function | Description |
| --- | --- |
| ombSdRegister( ) | Called by an service to register to Service Directory and create a Service Directory Profile |
| ombSdDeregister( ) | Called by service to deregister from Service Directory and delete an Service Directory Profile |
| ombSdUpdate( ) | Called by service to update its Service Directory Profile |
| ombSdDiscover( ) | Called by service to query Service Directory to discover OMB Service Directory Profile(s) of other OMB services connected to the OMB |
| ombSdSubscibe( ) | Called by service to subscribe to Service Directory to receive notifications regarding other OMB Service Discovery Profiles (e.g. creation of certain types of Profiles) |

TABLE 4

API Functions to Communicate with OMB Database

| Function | Description |
| --- | --- |
| ombDbRegister( ) | Called by service to register to OMB database in order to use database |
| ombDbDeregister( ) | Called by service to de-register from OMB database |
| ombDbCreateResource( ) | Called by service to create a resource within a OMB database |
| ombDbRetrieveResource( ) | Called by service to retrieve a resource from a OMB database |
| ombDbUpdateResource( ) | Called by service to update a resource within a OMB database |
| ombDbDeleteResource( ) | Called by service to delete a resource within a OMB database |
| ombDbFindAllSubscriptions( ) | Called by service to find all subscriptions recursively under a specified targeted resource within a OMB database |
| ombDbFindAllChildResources( ) | Called by service to find all children resources under a specified targeted resource within a OMB database (for one level only) |
| ombDbFindAllChildResourcesRecursively( ) | Called by service to find all children recursively under a specified targeted resource within a OMB database |
| ombDbIsResourcePresent( ) | Called by service to query OMB database to find resources based on query parameters (e.g., searchStrings) |

Table 5 lists the common set of parameters supported by the OMB API. These common parameters appear in many of the OMB API calls and are described here.

TABLE 5

Common Input and Output Parameters

| Parameter | Description |
| --- | --- |
| ombServiceID | Identifier of OMB Service initiating call<br>This parameter may not be used, if only a single OMB service is configured to use an OMB client, since the OMB client will know the OMB service that is calling it. |
| ombGroupId | OMB clients may be assigned additional, optional identifiers, such as an ombGroupId. Multiple ombGroupId's may be assigned to each OMB client. The ombGroupIdmay be used to group clients based on ownership, cost, type, access rights, etc. The ombGroupIdmay be provisioned into the service or it may be assigned at registration to the OMB. |
| ombServiceType | Services may also be assigned an ombServiceType. The ombServiceType identifies the type of service. For example, the ombServiceType may indicate that the associated service is a sensor or the associated service is for image processing. The ombServiceType may be provisioned into the service or it may be assigned at registration to the OMB. |
| ombTarget | Supported Values - OMB Service ID, OMB Service Type |
| ombBlocking | Supported Values - TRUE, FALSE<br>Used to specify blocking or non-blocking. When blocking is specified, OMB client will block the OMB service until a corresponding OMB message is received. When non-blocking is specified, OMB client will return immediately and rely on a specified callback function to forward an OMB message to the OMB service |
| ombCallbackFcn | Pointer to callback function that OMB client will call if/when it receives a published message from the Message broker. This is only applicable for non-blocking scenario.<br>The callback takes the following inputs:<br>    OMB Service ID and/or Type of OMB Message Originator<br>    Received OMB Message Type<br>    Received OMB Payload<br>    Received OMB Payload length<br>    Received OMB Token |

TABLE 5-continued

Common Input and Output Parameters

| Parameter | Description |
|---|---|
| | The OMB client is responsible for providing the above inputs to the callback function. All callback functions take these inputs; however, some may be set to "NULL". |
| ombRspCode | Response code returned by API function to OMB service (e.g. Success, Error Code, etc.) |
| ombTxMsgPayload | OMB payload that is transmitted by OMB API function |
| ombRxMsgType | OMB message type of message received by OMB API function |
| ombRxMsgPayload | OMB payload that is received by OMB API function |
| ombMsgID | The OMB Message ID value can be used by OMB clients to correlate requests and responses. |
| ombToken | The Token value can be used by OMB services to correlate requests and responses. Note, from the perspective of the OMB client and broker, this token is opaque and not used during OMB message processing (i.e. it is only used by OMB services). |

The ombConfig( ) function is called by a service to configure the OMB client with information specific to the service and Message broker. Further details are shown in Table 6.

TABLE 6 ombConfig( ) Input and Output Parameters

| Parameter | Description |
|---|---|
| ombRspCode | See Table 5 for description |
| ombCfgFile | The path/name of an OMB service specific configuration file containing configuration information described in Table 1. The configuration file may specify whether or not DNS-SD server is to be queried to fetch OMB Service Directory Profile for this service or not. If yes, the configuration file contains only the following information:<br>   DNS-SD server contact information (e.g. IP address, port, FQDN of service, etc.)<br>   Service ID assigned to OMB service<br>If DNS-SD is not to be queried, then configuration file contains all the information described in Table 1. |

Table 7 lists possible ombRegister( ) input and output parameters. The ombRegister( ) is called by an OMB service to register with a message bus backbone and create an OMB exchange. An exchange is part of the OMB. An exchange accepts messages from a service and routes it to a Queue. Once in the Queue, the message will be sent to one or more services. Basically, this function is used to create a connection to the OMB. The "connection" is an "OMB Exchange."

TABLE 7 ombRegister( ) Input and Output Parameters

| Parameter | Description |
|---|---|
| ombServiceID | See Table 5 for description |
| ombRspCode | See Table 5 for description |

Table 8 lists possible ombDeregister( ) input and output parameters. The ombDeregister( ) function is called by an OMB service to deregister with a Message broker.

TABLE 8 ombDeregister( ) Input and Output Parameters

| Parameter | Description |
|---|---|
| ombServiceID | See Table 5 for description |
| ombRspCode | See Table 5 for description |

The ombReceive( ) function is called by an OMB service to receive unsolicited messages from an OMB client. This receive can be done in either a blocking or non-blocking manner. In addition the reception can be done for one or more defined OMB message types.

When an OMB client receives an OMB message from a Message broker, it will check to determine whether the message is solicited or unsolicited. A solicited message has an OMB message ID that matches up with a previously transmitted OMB message from the OMB client (e.g., this message is a response to a previous request). An unsolicited message is an OMB message not matching up with a previously transmitted OMB message.

TABLE 9 ombReceive( ) Input and Output Parameters

| Parameter | Description |
|---|---|
| ombServiceID | See Table 5 for description |
| ombBlocking | See Table 5 for description |
| ombCallbackFcn | See Table 5 for description |
| ombRspCode | See Table 5 for description |
| ombRxMsgType | See Table 5 for description. This parameter is valid for blocking mode |
| ombRxServiceID | Identifier of OMB Service originating the received message |
| ombRxMsgPayload | See Table 5 for description. This parameter is valid for blocking mode |
| ombMsgID | See Table 5 for description. This parameter is valid for blocking mode |
| ombToken | See Table 5 for description. This parameter is valid for blocking mode |
| ombRxMsgTypeFilter | Supported Values - List of one or more OMB message types<br>Specifies one more applicable OMB message types.<br>OMB client uses this filter to qualify whether an incoming message is forwarded to the OMB service that invoked the ombReceive( ) (i.e. OMB message type matches filter). If this input is not provided, then the OMB client may use |

TABLE 9-continued ombReceive( ) Input and Output Parameters

| Parameter | Description |
| --- | --- |
| | the specified callback function to forward all OMB messages it receives to the corresponding OMB service that invoked the ombReceive( ). |

With reference to Table 9, Depending on the type of OMB message received, the OMB client may or may not decode the OMB message payload before forwarding it to the OMB service. For example, the OMB client decodes OMB message payloads for OMB messages originating from OMB Service Directory. While the OMB client does not decode OMB message payloads for OMB messages originating from OMB services that are not backbone services and for which the OMB client has no awareness/knowledge of (e.g., a oneM2M Service or an ETSI M2M Service, etc.).

Table 10 lists possible ombTransmit( ) input and output parameters The ombTransmit( ) function is called by an OMB service to transmit messages to other OMB services. This transmit can be done in either a blocking or non-blocking manner.

TABLE 10 ombTransmit( ) Input and Output Parameters

| Parameter | Description |
| --- | --- |
| ombServiceID | See Table 5 for description |
| ombTarget | See Table 5 for description |
| ombBlocking | See Table 5 for description |
| ombTxMsgPayload | See Table 5 for description |
| ombCallbackFcn | See Table 5 for description |
| ombTxMsgType | OMB message type to be transmitted. Note - If this parameter is not included, then OMB client will use the OMB TRANSMIT REQUEST type by default. |
| ombMsgID | See Table 5 for description Note - This parameter may be used by an OMB service when transmitting a response. In doing so, the OMB client of the originating OMB service can use this message ID to correlate the response with its request. |
| ombRspCode | OMB response code. See Table 5 for description. Note - This parameter may be used by an OMB service when transmitting a response. |
| ombToken | See Table 5 for description |
| ombRxMsgType | See Table 5 for description Note - This parameter is only valid for blocking mode |
| ombRxMsgPayload | See Table 5 for description Note - This parameter is only valid for blocking mode |
| ombRspCode | See Table 5 for description |

Table 11 lists possible ombSdRegister( ) input and output parameters. The ombSdRegister( ) function is called by an OMB service to create a service profile in the OMB Service Directory (via OMB not DNS-SD interface). Registration may have a lifetime associated with it such that it may need to be renewed via ombSdUpdate( ) before the lifetime expires. Otherwise, the registration may be automatically deleted by the OMB Service Directory. Information from configuration file and/or DNS TXT record may be used to create OMB Service Directory Profile

TABLE 11 ombSdRegister( ) Input and Output Parameters

| Parameter | Description |
| --- | --- |
| ombServiceID | See Table 5 for description |
| ombServiceType | See Table 5 for description |
| ombBlocking | See Table 5 for description |
| ombCallbackFcn | See Table 5 for description |
| ombToken | See Table 5 for description |
| ombSdRegExpTime | Expiration time of Service Directory registration. If this parameter is not included a default expiration time may be used. This default will be determined during the detailed design phase. |
| ombRspCode | See Table 5 for description |

Table 12 lists possible ombSdDeregister( ) input and output parameters. The ombSdDeregister( ) function is called by an OMB service to deregister a service profile from OMB service directory.

TABLE 12 ombSdDeregister( ) Input and Output Parameters

| Parameter | Description |
| --- | --- |
| ombServiceID | See Table 5 for description |
| ombBlocking | See Table 5 for description |
| ombCallbackFcn | See Table 5 for description |
| ombToken | See Table 5 for description |
| ombRspCode | See Table 5 for description |

Table 13 lists possible ombSdUpdate( ) input and output parameters The ombSdUpdate( ) function is called by an OMB service to update its Service Directory Profile. This function is used when an OMB service is aware of its OMB Service Directory Profile and dynamically updates/creates its own profile in the service directory.

TABLE 13 ombSdUpdate( ) Input and Output Parameters

| Parameter | Description |
| --- | --- |
| ombServiceID | See Table 5 for description |
| ombBlocking | See Table 5 for description |
| ombCallbackFcn | See Table 5 for description |
| ombSdProfile | OMB Service Directory Profile. |
| ombToken | See Table 5 for description |
| ombSdRegExpTime | Expiration time of OMB Service Directory registration. |
| ombRxMsgType | See Table 5 for description. This parameter is valid for blocking mode. |
| ombRxMsgPayload | See Table 5 for description. This parameter is valid for blocking mode. |
| ombRspCode | See Table 5 for description |

Table 14 lists possible ombSdDiscover( ) input and output parameters. The ombSdDiscover( ) function is called by an OMB service to query OMB service directory to discover and retrieve available OMB services connected to OMB matching a particular query.

This API call will make use of an underlying DNS-based service directory (when available). Otherwise it will make use of OMB-based Service Directory for discovery.

TABLE 14 ombSdDiscover( ) Input and Output Parameters

| Parameter | Description |
|---|---|
| ombServiceID | See Table 5 for description |
| ombBlocking | See Table 5 for description |
| ombCallbackFcn | See Table 5 for description |
| ombSdQuery | OMB discovery query |
| | Supported types of queries include queries based on: |
| |     OMB Service Type |
| |     OMB Service ID |
| ombToken | See Table 5 for description |
| ombSdResults | OMB discovery results |
| | Consists of a list of OMB service profiles. This list can either be a list of pointers to OMB service profiles or alternatively the list may contain OMB service profiles embedded within the list (if the profiles are not too big) An OMB service profile contains information such as names of Message broker exchanges, queues, topic spaces, etc. that can be used to communicate with the corresponding OMB service. |
| ombRxMsgType | See Table 5 for description Note - This parameter is only valid for blocking mode |
| ombRxMsgPayload | See Table 5 for description Note - This parameter is only valid for blocking mode |
| ombRspCode | See Table 5 for description |

Table 15 lists possible ombSdSubscribe( ) input and output parameters. The ombSdSubscribe( ) function is called by an OMB service to subscribe to an OMB service directory to receive notifications for state changes, such as when OMB service profiles are created, updated or deleted.

TABLE 15 ombSdSubscribe( ) Input and Output Parameters

| Parameter | Description |
|---|---|
| ombServiceID | See Table 5 for description |
| ombBlocking | See Table 5 for description |
| ombCallbackFcn | See Table 5 for description |
| ombSdSubscriptionCriteria | OMB Service Directory Subscription Criteria |
| | Supported types of criteria include: |
| |     CUD of a particular OMB Service Type |
| |     CUD of a particular OMB Service ID |
| | CUD = Create, Update, Delete |
| ombToken | See Table 5 for description |
| ombRxMsgType | See Table 5 for description. This parameter is valid for blocking mode. |
| ombRxMsgPayload | See Table 5 for description This parameter is valid for blocking mode. |
| ombRspCode | See Table 5 for description |

Table 16 lists possible ombDbRegister( ) input and output parameters. The ombDbRegister( ) function is called by an OMB service to register to an OMB database.

TABLE 16 ombDbRegister( ) Input and Output Parameters

| Parameter | Description |
|---|---|
| ombServiceID | See Table 5 for description |
| ombBlocking | See Table 5 for description |
| ombCallbackFcn | See Table 5 for description |
| ombDbUserName | User name and password to access database. Note - This information can alternatively be configured within OMB config file or DNS TXT record |
| ombToken | See Table 5 for description |
| ombRspCode | See Table 5 for description |

Table 17 lists possible ombDbDeregister( ) input and output parameters. The ombDbDeregister( ) function is called by an OMB service to deregister from an OMB database.

TABLE 17 ombDbDeregister( ) Input and Output Parameters

| Parameter | Description |
|---|---|
| ombServiceID | See Table 5 for description |
| ombBlocking | See Table 5 for description |
| ombCallbackFcn | See Table 5 for description |
| ombDbUserName | User name and password to access database. Note - This information can alternatively be configured within OMB config file or DNS TXT record |
| ombToken | See Table 5 for description |
| ombRspCode | See Table 5 for description |

Table 18 lists possible ombDbCreateResource( ) input and output parameters. The ombDbCreateResource( ) function is called by an OMB service to create a resource in an OMB database.

TABLE 18 ombDbCreateResource( ) Input and Output Parameters

| Parameter | Description |
|---|---|
| ombServiceID | See Table 5 for description |
| ombBlocking | See Table 5 for description |
| ombCallbackFcn | See Table 5 for description |
| ombToken | See Table 5 for description |
| ombRxMsgType | See Table 5 for description. This parameter is valid for blocking mode. |
| ombRxMsgPayload | See Table 5 for description This parameter is valid for blocking mode. |
| ombRspCode | See Table 5 for description |
| ombDbTarget | Target address (URI) of the resource to create in the database. |
| ombDbContent | Representation of resource to create in the database |

TABLE 18-continued ombDbCreateResource( ) Input and Output Parameters

| Parameter | Description |
| --- | --- |
| ombDbContentType | Type of the content (XML, JSON, etc.) |
| ombDbResourceType | the type of the resource being created |
| ombDbContentCreated | Representation of resource created in the database |

Table 19 lists possible ombDbRetrieveResource( ) input and output parameters. The ombDbRetrieveResource( ) function is called by an OMB service to retrieve a resource from an OMB database.

TABLE 19 ombDbRetrieveResource( ) Input and Output Parameters

| Parameter | Description |
| --- | --- |
| ombServiceID | See Table 5 for description |
| ombBlocking | See Table 5 for description |
| ombCallbackFcn | See Table 5 for description |
| ombToken | See Table 5 for description |
| ombRxMsgType | See Table 5 for description. This parameter is valid for blocking mode. |
| ombRxMsgPayload | See Table 5 for description This parameter is valid for blocking mode. |
| ombRspCode | See Table 5 for description |
| ombDbTarget | Target address (URI) of the resource to retrieve in the database. |
| ombDbContentType | Preferred type of the content (XML, JSON, etc.) |
| ombDbResourceType | Type of the resource being retrieved |
| ombDbContent | Representation of resource retrieved from the database |

Table 20 lists possible ombDbUpdateResource( ) input and output parameters. The ombDbUpdateResource( ) function is called by an OMB service to update a resource in an OMB database.

TABLE 20 ombDbUpdateResource( ) Input and Output Parameters

| Parameter | Description |
| --- | --- |
| ombServiceID | See Table 5 for description |
| ombBlocking | See Table 5 for description |
| ombCallbackFcn | See Table 5 for description |
| ombToken | See Table 5 for description |
| ombRxMsgType | See Table 5 for description This parameter is valid for blocking mode. |
| ombRxMsgPayload | See Table 5 for description This parameter is valid for blocking mode. |
| ombRspCode | See Table 5 for description |
| ombDbTarget | Target address (URI) of the resource to update in the database. |
| ombDbContent | Representation of resource to update in the database |
| ombDbContentType | Type of the content (XML, JSON, etc.) |
| ombDbResourceType | Type of the resource being updated |
| ombDbContentUpdated | Updated representation of resource in the database |

Table 21 lists possible ombDbDeleteResource( ) input and output parameters. The ombDbDeleteResource( ) function is called by an OMB service to delete a resource in an OMB database.

TABLE 21 ombDbDeleteResource( ) Input and Output Parameters

| Parameter | Description |
| --- | --- |
| ombServiceID | See Table 5 for description |
| ombBlocking | See Table 5 for description |
| ombCallbackFcn | See Table 5 for description |
| ombToken | See Table 5 for description |
| ombRxMsgType | See Table 5 for description This parameter is valid for blocking mode. |
| ombRxMsgPayload | See Table 5 for description This parameter is valid for blocking mode. |
| ombRspCode | See Table 5 for description |
| ombDbTarget | Target address (URI) of the resource to delete in the database. |

Table 22 lists possible ombDbFindAllSubscriptions( ) input and output parameters. The ombDbFindAllSubscriptions( ) function is called by an OMB service to recursively find all the subscription resources under a targeted resource within the database.

TABLE 22 ombDbFindAllSubscriptions( ) Input and Output Parameters

| Parameter | Description |
| --- | --- |
| ombServiceID | See Table 5 for description |
| ombBlocking | See Table 5 for description |
| ombCallbackFcn | See Table 5 for description |
| ombToken | See Table 5 for description |
| ombRxMsgType | See Table 5 for description This parameter is valid for blocking mode. |
| ombRxMsgPayload | See Table 5 for description. This parameter is valid for blocking mode. |
| ombRspCode | See Table 5 for description |
| ombDbTarget | Target URI of the resource under which the find will be performed in the database. |
| ombDbResults | A list of URIs of subscriptions found |

Table 23 lists possible ombDbFindAllChildResources( ) input and output parameters. The ombDbFindAllChildResources( ) function is called by an OMB service to find all child resources under a parent resource for one level only within the OMB database.

TABLE 23 ombDbFindAllChildResources( ) Input and Output Parameters

| Parameter | Description |
| --- | --- |
| ombServiceID | See Table 5 for description |
| ombBlocking | See Table 5 for description |
| ombCallbackFcn | See Table 5 for description |
| ombToken | See Table 5 for description |
| ombRxMsgType | See Table 5 for description. This parameter is valid for blocking mode. |
| ombRxMsgPayload | See Table 5 for description. This parameter is valid for blocking mode. |
| ombRspCode | See Table 5 for description |
| ombDbTarget | Target URI of the resource under which the find will be performed in the database. |
| ombDbResults | A list of URIs of child resources found |

Table 24 lists possible ombDbFindAllChildResourcesRecursively( ) input and output parameters. The ombDbFindAllChildResourcesRecursively( ) function is called by an OMB service to find all child resources under a given targeted resource recursively within the OMB database.

TABLE 24 ombDbFindAllChildResourcesRecursively( ) Input and Output Parameters

| Parameter | Description |
|---|---|
| ombServiceID | See Table 5 for description |
| ombBlocking | See Table 5 for description |
| ombCallbackFcn | See Table 5 for description |
| ombToken | See Table 5 for description |
| ombRxMsgType | See Table 5 for description. This parameter is valid for blocking mode. |
| ombRxMsgPayload | See Table 5 for description Note - This parameter is valid for blocking mode. |
| ombRspCode | See Table 5 for description |
| ombDbTarget | Target URI of the resource under which the recursive find will be performed in the database. |
| ombDbResults | A list of URIs of child resources found |

Table 25 lists possible ombDbIsResourcePresent( ) input and output parameters. The ombDbIsResourcePresent( ) function is called by an OMB service to recursively search OMB database for resources matching a specified searchString.

TABLE 25 ombDbIsResourcePresent( ) Input and Output Parameters

| Parameter | Description |
|---|---|
| ombServiceID | See Table 5 for description |
| ombBlocking | See Table 5 for description |
| ombCallbackFcn | See Table 5 for description |
| ombToken | See Table 5 for description |
| ombRxMsgType | See Table 5 for description. This parameter is valid for blocking mode. |
| ombRxMsgPayload | See Table 5 for description. This parameter is valid for blocking mode. |
| ombRspCode | See Table 5 for description |
| ombDbTarget | Target URI of the resource under which the search will be performed in the database. If no target URI is specified, then entire database will be searched, subject to the permissions of the client. |
| ombDbResults | A list of URIs of matching resources found |

Conventional messaging bus protocols, such as Advanced Message Queuing Protocol (AMQP) and Message Queuing Telemetry Transport (MQTT), do not have built-in support for dynamically discovering what services are available on a message bus. Thus, a service that is connected to a message bus might not be aware of what other services are on the message bus. This can result in the underutilization of services of the message bus. For example, a home automation service provider might be able to more efficiently manage a home heating and cooling system if it is able to connect to a service that provides information about local weather conditions. AMQP and MQTT provide no means for the home automation provider to dynamically discover and use the weather service.

When a service discovers another service that it wants to access, it is possible that the underlying transport protocols of the two services will not be compatible. For example, a service that is hosted on a low cost IoT sensor may connect to the messaging system via a lightweight UDP based protocol such as CoAP while a data mining service that is hosted on a server may connect to the messaging system via a TCP based protocol such as WebSockets. The API or protocol discussed herein is used by the services to connect with the message broker can be agnostic to the transport protocols that are used by peer services. New protocols can be supported by updating the transport interface of the OMB Client 265. OMB Client API would not necessarily change, the transport interface would change. The message broker would also be updated to support the new transport interface Services may dynamically associate and disassociate with a message bus. When services associate with the message bus, other services may be notified. For example, a heating and cooling system service may desire to know when a weather sensing service is available. When services disassociate with the message bus, other services may be notified. For example, the same heating and cooling system service may desire to know when the weather sensing service disassociates so that it may locate a new weather sensing service. Conventionally, one would not assume that all services that are associated with the message bus would be notified when a new member associates or disassociates with the message bus. The message bus protocol or infrastructure as discussed herein provide a means for services to indicate what other services it is interested in and request that the message bus inform the service when those other services associate or disassociate with the message bus.

Throughout this disclosure there is a reference to services that connect with a message bus backbone and use a service directory to browse what services are available (e.g., registered or connected with) via one or more components of a message bus backbone (e.g. message broker 203). The term "device" can be used in an interchangeable way as service. A service often refers to a logical entity that performs some type of calculation or storage. A device often refers to something that is physical; it may have lesser functionality than a service. For example, a siren device may simply collect sensed information from other services and make a decision about whether or not to sound a siren. Both services and devices can connect with the message bus backbone as disclosed herein and use the service directory to browse what services are available via one or more components of the message bus backbone. A resource that is discussed herein is an entity that can be identified, named, and addressed (typically using URIs) via a network (e.g. the Web).

While the oneM2M and ETSI M2M architectures are described by way of background herein and may be used to illustrate subject matter described herein, it is understood that implementations of the subject matter described herein may vary while remaining within the scope of the present disclosure. One skilled in the art will also recognize that the disclosed subject matter is not limited to implementations using the oneM2M and ETSI M2M architectures discussed herein, but rather may be implemented in other architectures and systems.

Figure 17A:
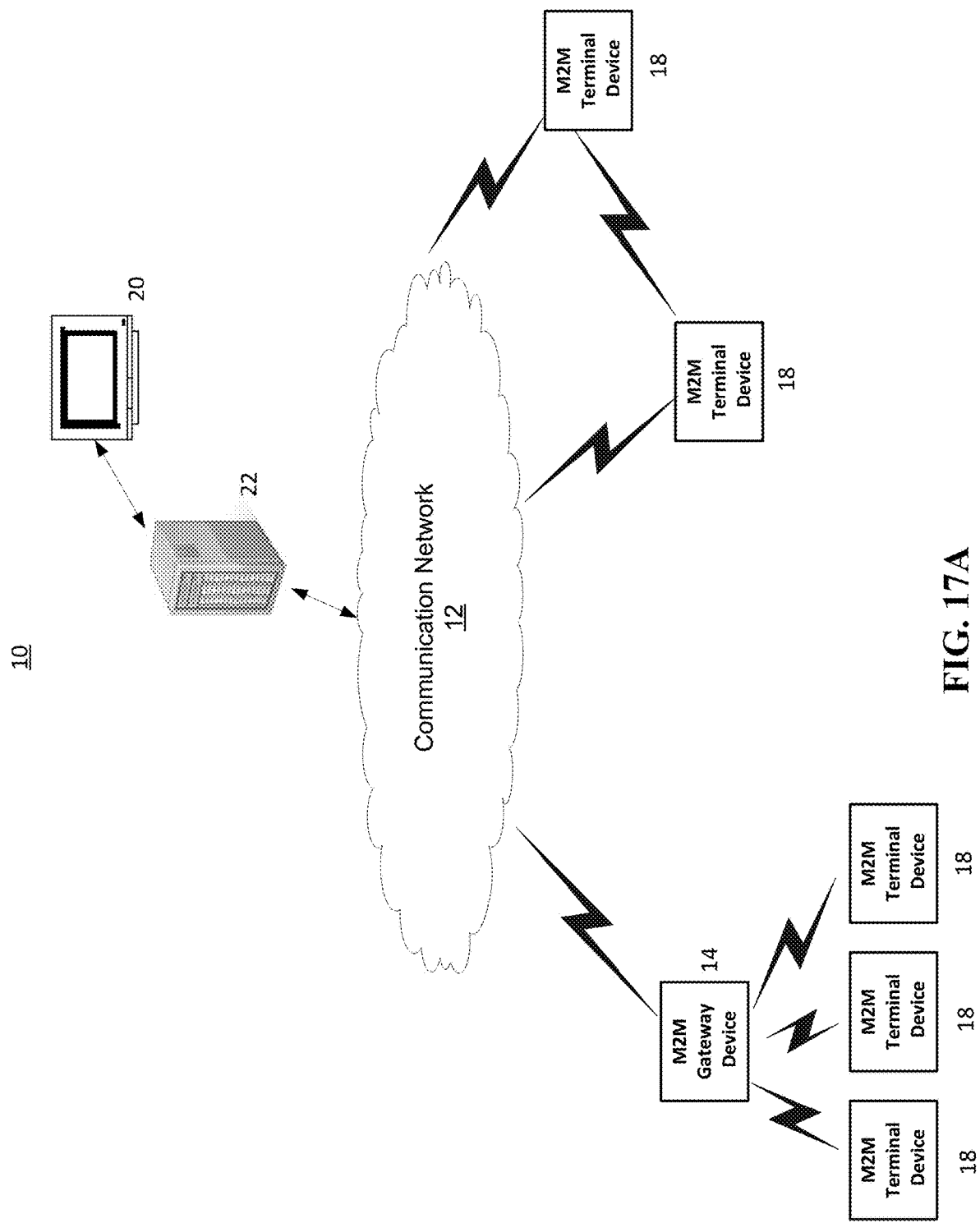
FIG. 17A is a system diagram of an example machine-to-machine (M2M) or Internet of Things (IoT) communication system in which the disclosed subject matter may be implemented.

FIG. 17A is a diagram of an example machine-to machine (M2M), Internet of Things (IoT), or Web of Things (WoT) communication system 10 in which one or more disclosed concepts may be implemented. Generally, M2M technologies provide building blocks for the IoT/WoT, and any M2M device, M2M gateway or M2M service platform may be a component of the IoT/WoT as well as an IoT/WoT service layer, etc.

As shown in FIG. 17A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 17A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 17B:
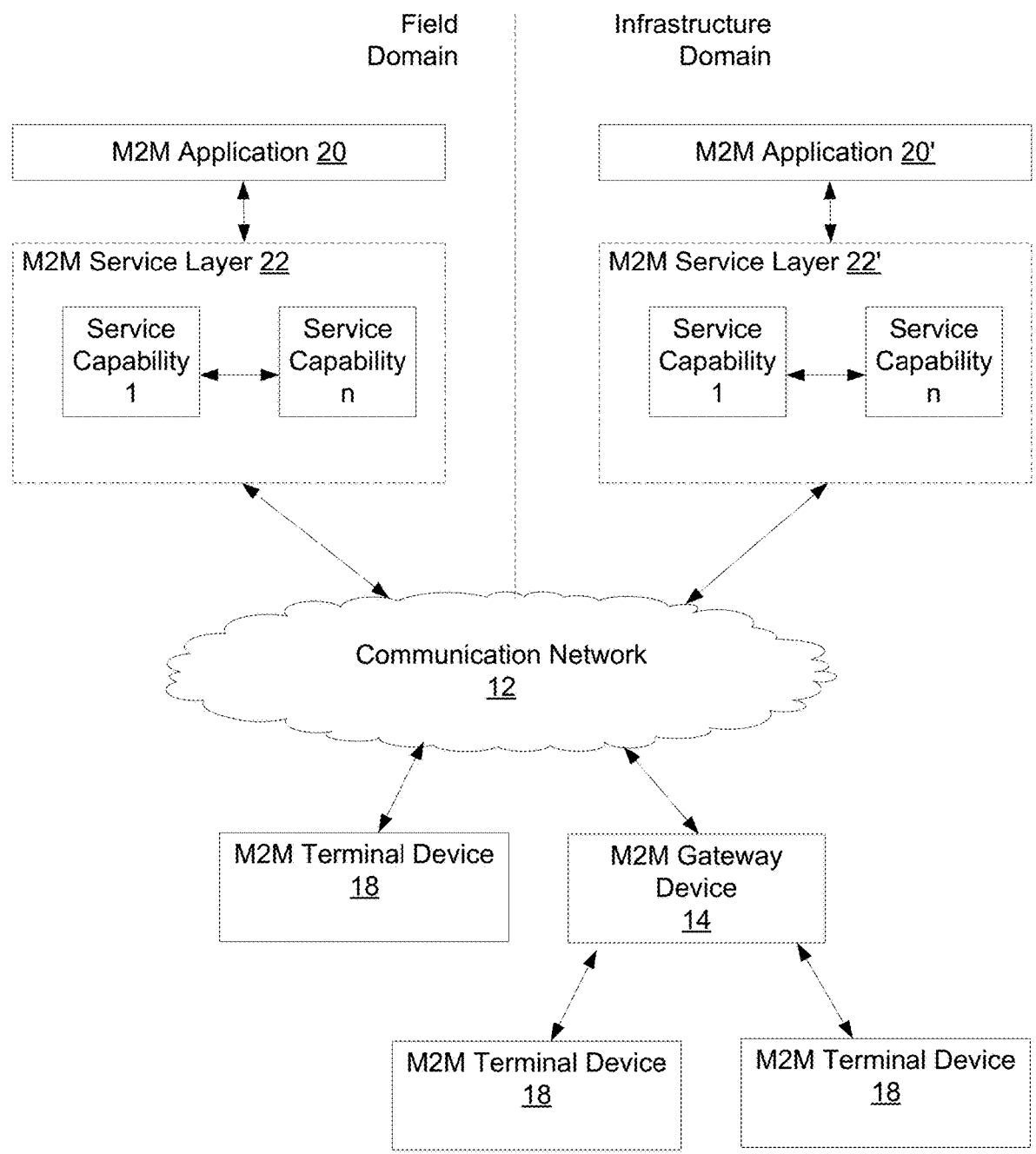
FIG. 17B is a system diagram of an example architecture that may be used within the M2M/IoT communications system illustrated in FIG. 17A.

Referring to FIG. 17B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 17B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using one or more components of an open message bus architecture, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The one or more components of an open message bus architecture of the present application may be implemented in connection with a service layer. The service layer is a software middleware layer that supports value-added service capabilities through a set of application programming interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain one or more components of an open message bus architecture of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). Further, the one or more components of an open message bus architecture of the present application can be implemented as part of an M2M network that uses a Service Oriented Architecture (SOA) and/or a resource-oriented architecture (ROA) to access services such as the one or more components of an open message bus architecture of the present application.

Figure 17C:
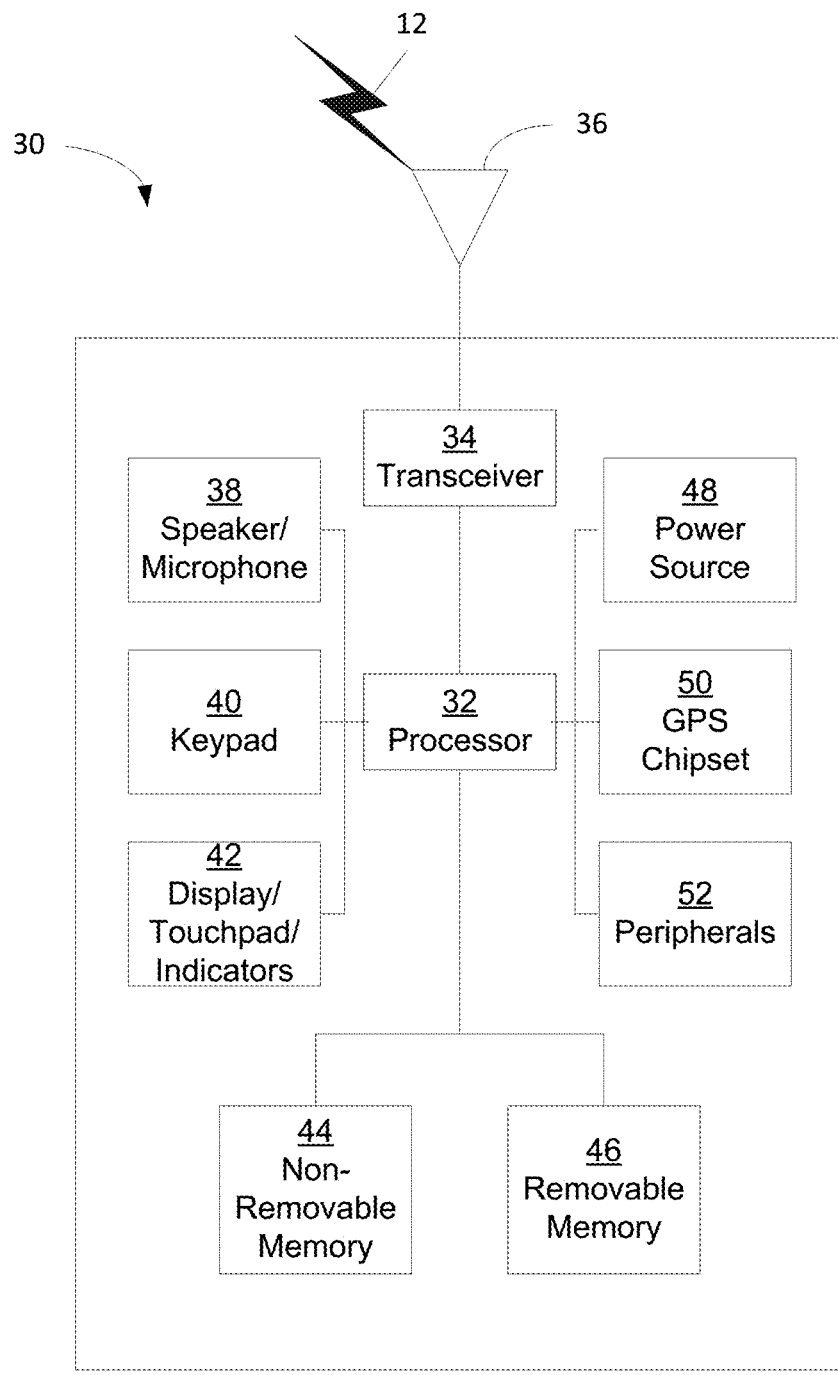
FIG. 17C is a system diagram of an example M2M/IoT terminal or gateway device that may be used within the communications system illustrated in FIG. 17A.

FIG. 17C is a system diagram of an example M2M device 30, such as an M2M terminal device 18. As shown in FIG. 17C, the M2M device 30 (e.g., location tracking device 220) may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30

(e.g., location tracking device 220) may be a device that uses the disclosed systems and methods for an open message bus architecture.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 17C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, the transmit/receive element 36 may be an antenna configured to transmit and/or receive RF signals. The transmit/receive element 36 may support various networks and air interfaces, such as WLAN, WPAN, cellular, and the like. In an example, the transmit/receive element 36 may be an emitter/detector configured to transmit and/or receive IR, UV, or visible light signals, for example. In yet another example, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 17C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether one or more components of an open message bus architecture in some of the examples described herein are successful or unsuccessful (e.g., service discovery, service subscription, etc.), or otherwise indicate a status of one or more components of an open message bus architecture. The control lighting patterns, images, or colors on the display or indicators 42 may be reflective of the status of any of the method flows or components in the FIG.'s (e.g., FIG. 1-FIG. 16) illustrated or discussed herein. Disclosed herein are messages and procedures for creating and implementing an open message bus architecture. The messages and procedures can be extended to provide interface/API for users to request configuring an open message bus via an input source (e.g., speaker/microphone 38, keypad 40, or display/touchpad 42) and request, configure, or query open message bus related messages, among other things that may be displayed on display 42.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 17D:
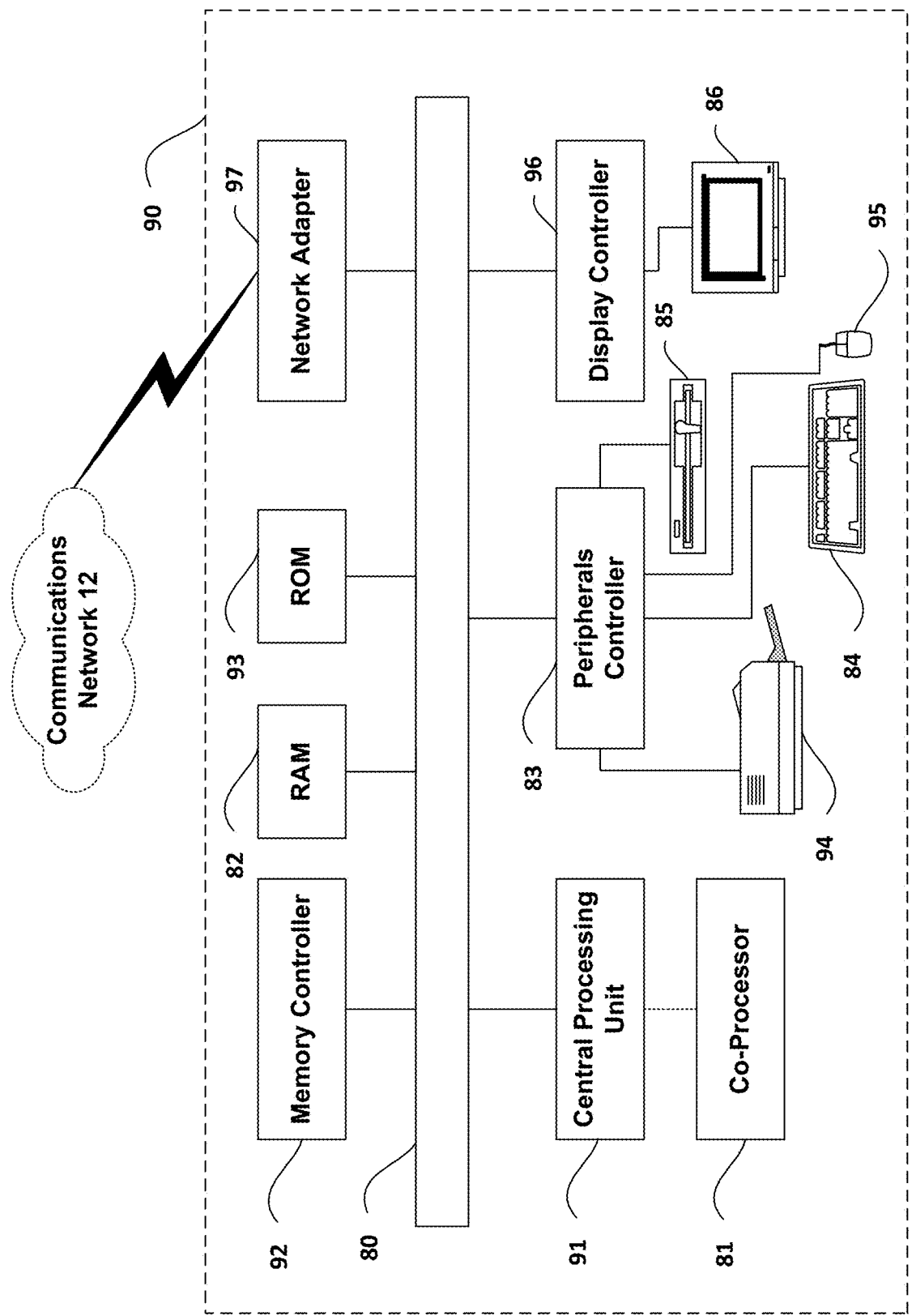
FIG. 17D is a block diagram of an example computing system in which aspects of the communication system of FIG. 17A may be embodied.

FIG. 17D is a block diagram of an exemplary computing system 90 on which, for example, the M2M service platform 22 of FIG. 17A and FIG. 17B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for one or more components of an open message bus architecture, such as receiving DNS-SD messages for browsing service associated with a message bus backbone.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 17A and FIG. 17B.

Figure 18:
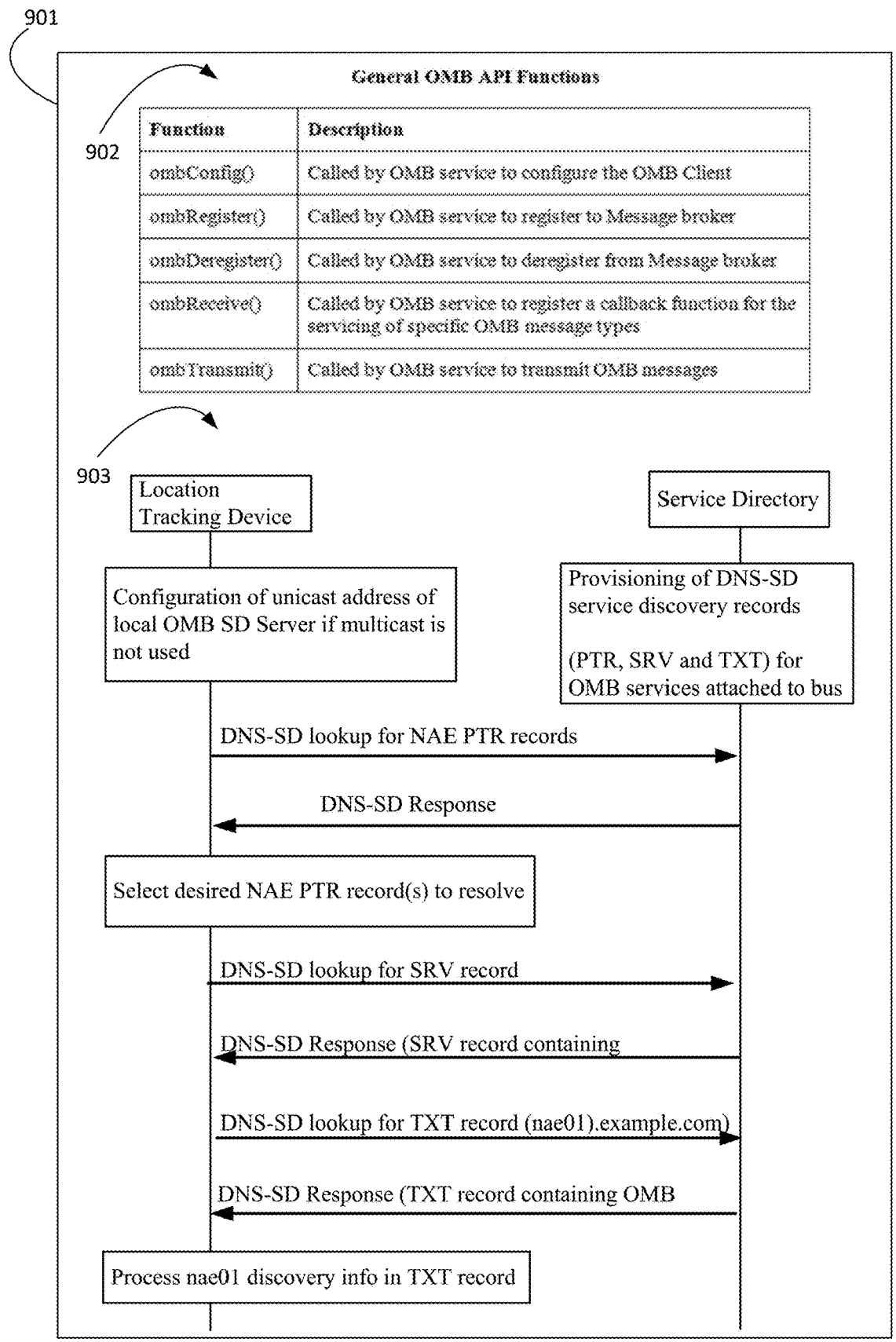
FIG. 18 illustrates an exemplary user interface associated with message bus service directory.

FIG. 18 illustrates an exemplary display (e.g., graphical user interface) that may be generated based on the methods and systems discussed herein. Display interface 901 (e.g., touch screen display) may provide text in block 902 associated with message bus service directory, such as the parameters of Table 1 through Table 25. In another example, progress of any of the steps (e.g., sent messages or success of steps) discussed herein may be displayed in block 902 (e.g., FIG. 10-FIG. 15). In addition, graphical output 903 may be displayed on display interface 901 (e.g., associated with FIG. 1-FIG. 17D). Graphical output 903 may be the topology of the devices in a cluster, a graphical output of the progress of any method or systems discussed herein, or the like. For example, administration services 250 (see FIG. 8) with the assistance of a graphic user interface may be used for administering and monitoring client services connecting to an OMB. Administration services 250 may be used for configuration and monitoring of the Message bus service directory.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred methods, systems, or apparatuses of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims. All combinations of elements with regard to method, system, computer readable storage medium, apparatus, or the like as discussed below are contemplated in a manner that is consistent with the other portions of the detail description.

A method, system, computer readable storage medium, or apparatus has means for sending a request for information about available services associated with a message broker; receiving a response comprising a description of the available services; selecting a first available service of the available services from the response; and connecting with the message broker based on the description of the first available service in the response. The request for information may include a DNS-SD lookup for a pointer record. The response may be a DNS-SD response.

A method, system, computer readable storage medium, or apparatus has means for loading a profile of a first service into a service directory that catalogs the services available via a message broker, the first service connected with the message broker; receiving a request by a second service to browse the service directory; receiving, from the second service, a request to connect with the message broker; and connecting the first service to the second service via the message broker. The request to browse the service directory may be associated with a DNS-SD interface. The message broker may be connected with an administration service. The message broker may be connected with a database service. The first service may be connected with the message broker via an application programming interface connected with a message bus client. There may be notification of the second service when the first service disconnects with the message broker. There may be a subscription, by the second service, to receive notifications when a third service with a matching profile that connects with the message broker.

A method, system, computer readable storage medium, or apparatus has means for connecting a first service with a second service via a message broker; and sending, by the first service, a request comprising instructions to notify the first service when a state changes with a second service or third service or a state changes with a class of services connected with the message broker. The state change may include delete, create, or update of a service profile of the second service or the third service. The state change may include delete, create, or update of the second service or the third service.

A method, system, computer readable storage medium, or apparatus has means for a first service, the first service manages profiles that describe a plurality of services; a message bus client communicatively connected with the first service; and a message broker that is communicatively connected with the first service and the message bus client, the message bus client providing an application programming interface (API) for the first service to connect with the message bus. The API may allow the first service to identify itself with a service identifier or a service type identifier. The API may allow the first service to indicate if an API request is blocking or non-blocking. The API may allow the first service to provide a token value, a function name, or a pointer to a function for each API call or each non-blocking API call. The token may be used by the first service to correlate a response with an original API call. The API may allow the first service to indicate what function is called when returning to a non-blocking request. The API may provide a set of commands for the first service to communicate with the message broker without executing commands specific to an underlying transport protocol used between the first service and the message broker.

What is claimed:

1. A device dynamically discovering what services are available on a message bus, the device comprising:
   a processor; and
   a memory connected with the processor, the memory comprising executable instructions that when executed by the processor cause the processor to effectuate operations comprising:
      requesting information about available services associated with a message broker in order to discover the available services, the request comprising:
         a service identifier,
         a service type, and
         an indication of whether the request is blocking or non-blocking;
      receiving a response comprising a description of the available services, the description comprising a contact address of the message broker and respective profiles of the respective available services;
      reviewing a first profile associated with a first service of the available services from the response, wherein the first service provides token values for each non-blocking request, the token values used by the first service to correlate a response with an original application programming interface call;
      connecting with the message broker based on the description of the first profile of the first service in the response;
      based on the connecting with the message broker based on the description of the first service in the response, publishing a profile with information about services available on the device; and
      based on the connecting with the message broker based on the description of the first profile of the first service in the response, sending a subscription request to receive notifications when a second available service that matches a second profile subsequently connects with the message broker.

2. The device of claim 1, wherein the response that comprises the description of available services is from a service directory connected with the message broker, wherein the available services comprise a weather sensing service.

3. The device of claim 2, wherein the service directory catalogs the services available via the message broker.

4. The device of claim 2, wherein the request to browse the service directory is associated with a DNS-SD interface and determining whether or not to query a DNS-SD server to fetch the second profile for the second available service, wherein the second profile is a service directory profile.

5. The device of claim 1, wherein the request for information comprises a DNS-SD lookup for a pointer record.

6. The device of claim 1, wherein the response is a DNS-SD response.

7. The device of claim 1, the operations further comprising sending a DNS service location record for the first service.

8. The device of claim 1, wherein the message broker connects via a transport agnostic application programming interface.

9. A method dynamically discovering what services are available on a message bus, the method comprising:
   requesting, by a device, from a first service information about available services associated with a message broker in order to discover the available services, the request comprising a service identifier or a service type;
   receiving a response comprising a description of the available services, the description comprising a contact address of the message broker and respective profiles of the respective available services;
   reviewing a second profile associated with a second service of the available services from the response, wherein the first service provides token values for each non-blocking request, the token values used by the first service to correlate a response with an original application programming interface call;
   connecting with the message broker based on the description of the second profile of the second service in the response;
   based on the connecting with the message broker based on the description of the first service in the response, publishing a profile with information about services available on the device; and
   based on the connecting with the message broker based on the description of the second profile of the second service in the response, sending a subscription request to receive notifications when a subsequent available service that matches a subsequent profile subsequently connects with the message broker.

10. The method of claim 9, wherein the request for information comprises a DNS-SD lookup for a pointer record.

11. The method of claim 9, wherein the response is a DNS-SD response.

12. The method of claim 9, the operations further comprising sending a DNS service location record for the second service.

13. The method of claim 9, wherein the message broker connects via a transport agnostic application programming interface.

14. The method of claim 9, the operations further comprising notifying the first service when the second service disconnects with the message broker.

15. A computer readable storage medium comprising computer executable instructions that when executed by a computing device cause said computing device to effectuate operations comprising:
  requesting, by a device, information about available services associated with a message broker in order to discover the available services, the request comprising:
    a service identifier,
    a service type, and
    an indication of whether the request is blocking or non-blocking;
  receiving a response comprising a description of the available services, the description comprising a contact address of the message broker and respective profiles of the respective available services;
  reviewing a first profile associated with a first service of the available services from the response, wherein the first service provides token values for each non-blocking request, the token values used by the first service to correlate a response with an original application programming interface call;
  connecting with the message broker based on the description of the first profile of the first service in the response;
  based on the connecting with the message broker based on the description of the first service in the response, publishing a profile with information about services available on the device; and
  based on the connecting with the message broker based on the description of the first profile of the first service in the response, sending a subscription request to receive notifications when a second available service that matches a second profile subsequently connects with the message broker.

16. The device of claim 15, wherein the response that comprises the description of available services is from a service directory connected with the message broker.

17. The device of claim 16, wherein the service directory catalogs the services available via the message broker.

18. The device of claim 16, wherein the request to browse the service directory is associated with a DNS-SD interface.

* * * * *